United States Patent [19]

Ikemura et al.

[11] Patent Number: 4,963,915
[45] Date of Patent: Oct. 16, 1990

[54] BRIGHTNESS MEASURING APPARATUS FOR PROVIDING ADEQUATE OBJECT BRIGHTNESS AND A FLASHLIGHT EMISSION APPARATUS PROVIDING ADEQUATE EXPOSURE, IRRESPECTIVE OF PHOTOGRAPHING CONDITIONS

[75] Inventors: Masayuki Ikemura; Takehiko Karasaki; Manabu Inoue, all of Osaka, Japan

[73] Assignee: Minolta Camera Kabushiki Kaisha, Osaka, Japan

[21] Appl. No.: 352,502

[22] Filed: May 16, 1989

[30] Foreign Application Priority Data

May 16, 1988 [JP] Japan ................... 63-118620
May 16, 1988 [JP] Japan ................... 63-118621

[51] Int. Cl.$^5$ .............................................. G03B 7/08
[52] U.S. Cl. ............................................. 354/432
[58] Field of Search ........ 354/414, 429, 430, 431-434; 356/221, 222; 250/214 P

[56] References Cited

U.S. PATENT DOCUMENTS 4,331,400  5/1982  Brownstein et al. ............... 354/414
4,664,495  5/1987  Alyfuku et al. ................. 354/432 X
4,690,536  9/1987  Nakai et al. .................... 354/432 X
4,705,382  11/1987 Mukai et al. .................... 354/432 X
4,782,357  11/1988 Hayakawa et al. ................ 354/432 X
4,800,409  1/1989  Matsuda et al. .................. 354/432 X

FOREIGN PATENT DOCUMENTS 61-173226  8/1986  Japan .
61-279829  12/1986 Japan .

Primary Examiner—W. R. Perkey
Attorney, Agent, or Firm—Burns, Doane, Swecker & Mathis

[57] ABSTRACT

The brightness measuring apparatus according to this invention comprises a plurality of light receiving elements for respectively receive light from a plurality of areas in a photographic range and output values corresponding to the areas based on the amounts of light received, and judges whether or not the object is under rear light conditions based on the outputted values and the value of rear light detection level which is decided based on focal length of a photographing lens, image magnification, object distance, or brightness of background.

17 Claims, 26 Drawing Sheets

BRIGHTNESS MEASURING APPARATUS FOR PROVIDING ADEQUATE OBJECT BRIGHTNESS AND A FLASHLIGHT EMISSION APPARATUS PROVIDING ADEQUATE EXPOSURE, IRRESPECTIVE OF PHOTOGRAPHING CONDITIONS

CROSS-REFERENCE TO RELATED, COPENDING APPLICATION

Related, copending application of particular interest to the instant application is U.S. Ser. No. 340,459 entitled "Exposure Controlling Apparatus of a Camera Having a Plurality of Areas for Measuring Brightness", filed Apr. 19, 1989 and assigned to the same assignee of the instant application.

BACKGROUND OF THE INVENTION

1. Field of the Invention

This invention relates, in one aspect, to a brightness measuring apparatus and more particularly to a brightness measuring apparatus adapted to measure brightness in a plurality of areas in an object field and find the brightness of a main object. In another aspect, this invention relates to a system for flash photography apparatus.

2. Description of the Related Art

Several cameras have heretofore been proposed in which a photographing field or scene is divided into a plurality of areas for achieving the proper exposure of the main object to be photographed.

For example, Japanese Patent Laying-Open No. 58229/1987 discloses a camera which is so designed that a scene to be photographed is divided into a central area and a peripheral area with said central area being further subdivided into two areas, top and bottom, and which is equipped with a brightness measuring device adapted to measure brightness in these areas independently. In photographing with this camera under ambient light conditions, the rear light condition is detected and the exposure controlling value calculated on the basis of either the smaller (darker) (hereinafter referred to as brightness data $BV_1$) of the two values obtained in the respective central areas or the value (hereinafter referred to as brightness data $BV_3$) determined from said brightness data $BV_1$ and the brightness value obtained in the peripheral area (hereinafter referred to as brightness data $BV_2$) To be specific, in this camera, when the ambient light condition is dark with the value of brightness data $BV_1$ being lower than a predetermined level, the detection of rear light and the calculation of the exposure controlling value are performed according to said brightness data $BV_3$ (average brightness value). Otherwise, the detection of rear light and the calculation of the exposure controlling value are performed according to brightness data $BV_1$.

However, when, as in the prior art camera described above, the central zone of the brightness measuring area is divided into a plurality of areas and brightness measurements are independently performed in these areas, the outputs of photosensor elements in the central areas may be increased beyond the true values, under rear light conditions, by background brightness and cross talk among the sensor elements. Furthermore, the absolute value of this error varies with the positional relation between the area of brightness measurement and the main object (cf. FIG. 12).

Therefore, when the central area is thus divided into more than one areas and the average of the brightness values in these central areas is employed, the rear light detection cannot be accurate. Moreover, if this average value of brightness in the central area is regarded as the brightness of the main object, the value will not represent the true brightness of the main object.

On the other hand, if the brightness of the main object is determined from one of the measured brightness values in the central areas, an error will be inevitable owing to the reflectance, which may be varying, of the main object. Particularly under front light conditions, the background brightness will not be a major influential factor but the influence of reflectance will be remarkable.

Furthermore, Japanese Patent Laying-Open No. 58229/1987 discloses a flash photographing system which performs exposure control so as to overexpose the background under rear light conditions and actuates a flashlight emission to insure the proper exposure of the main object and, at the same time, allow an impression of rear light photography to be reproduced in the picture. In flash photographing with the above photographing system under front light conditions (where the difference in brightness between the main object and the background is small or the main object is brighter than the background), the main object is overexposed at times because, in this system, exposure control is made to insure the proper exposure of the background. Particularly in a situation where the main object is brighter than the background, even ambient light alone causes an overexposure of the main object so that as flash light is superimposed on ambient light, the main object is markedly overexposed.

Still further, there have been proposed cameras which judging whether rear light photography or front light photography is to be carried out. These cameras have means for measuring brightness of the center area, means for measuring brightness of the peripheral area, and means for judging the scene to be photographed is rear light condition when the brightness of the peripheral area is high by a predetermined value (rear detection level) than that of the central area. But, in such conventional cameras, since the rear light detection level is fixed, it is not always to accurately detect the rear light condition. For example, in the conventional cameras, it is not possible to accurately detect the rear light condition when the proportion of the object in the light measuring area is pretty small or pretty big.

SUMMARY OF THE INVENTION

It is an object of this invention to accurately measure the brightness of the main object in a brightness measuring system.

It is another object of the invention to accurately measure the brightness of the main object irrespective of photographing conditions, front light or rear light in a brightness measuring system.

It is a further object of the invention to accurate measurement of the brightness of the main object in a brightness measuring system comprising a plurality of brightness measuring areas.

It is a still further object of the invention to be least susceptible to the influence of the reflectance of the main object in a brightness measuring system comprising a plurality of brightness measuring areas.

It is a still another object of the invention to obtain a correct exposure of the main object irrespective of photographing conditions, front light or rear light in a flash photographing system.

It is still further another object of the present invention to detect the rear light condition in any condition in a rear light detecting apparatus.

For accomplishing the above-mentioned objects, the brightness measuring apparatus according to this invention comprises a light receiving means, focal length detecting means, deciding means and rear light judging means. The light receiving means comprises a plurality of light receiving elements for receiving light from a plurality of areas in a photographic range and outputs values for the respective areas based on the amounts of light received by said light receiving elements. The focal length detecting means detects the focal length of a photographing lens. The deciding means decides a rear light detection level value based on the detected focal length. And the rear light judging means judges whether or not an object is to be photographed under a rear light condition based on the output values from the light receiving means and the rear light detection level.

The brightness measuring apparatus thus constructed is capable of detecting the rear light condition with accuracy.

The flash photographing apparatus provided by this invention for accomplishing the above-mentioned objects comprises first brightness measuring means, second brightness measuring means, rear light judging means, flash light emission means, selection means, exposure controlling value calculation means, exposure controlling means and emission controlling means. The first brightness measuring means measures a brightness of a main object which is situated in an approximate center of a photographing region or field. The second brightness measuring means measures a brightness of a background in a peripheral area of the field. The rear light judging means determines, based on the output of the first brightness measuring means and the output of the second brightness measuring means, whether the object or scene to be photographed is under rear light conditions. The flashlight emission means generate flashlight emissions. The selection means selects a forced emission mode in which photographing is performed always with a flashlight emission irrespective of the brightness of the main object and that of the background. The exposure controlling value calculation means calculates an exposure controlling value such that the peripheral area will be overexposed by a first predetermined amount when the rear light judging means has determined that the scene to be photographed is under rear light conditions or conversely an exposure controlling value such that the main object will be underexposed by a second predetermined amount when said rear light sensor means has determined that the scene to be photographed is not under rear light conditions and said selection means has selected the forced emission mode. The exposure controlling means controls exposure based on the exposure controlling value calculated by the exposure controlling value calculation means. The emission controlling means actuates the flashlight emission means when the rear light judging means has determined that the scene to be photographed is under rear light conditions or said selection means has selected the forced emission mode.

The flash photographing apparatus thus constructed provides the proper exposure to insure effective photography irrespective of whether the scene or object to be photographed is under front light conditions or under rear light conditions The foregoing and other objects, features, aspects and advantages of the present invention will become more apparent from the following detailed description of the present invention when taken in conjunction with the accompanying drawings.

DESCRIPTION OF THE PREFERRED EMBODIMENTS

The camera embodying the principles of this invention is described hereinafter with reference to the accompanying drawings. It should be understood that this is a camera which has interchangeable focal lengths (38 mm and 80 mm) and accepts a teleconverter for telephotography (corresponding to a focal length of 105 mm).

[Overall Construction]

Figure 1:
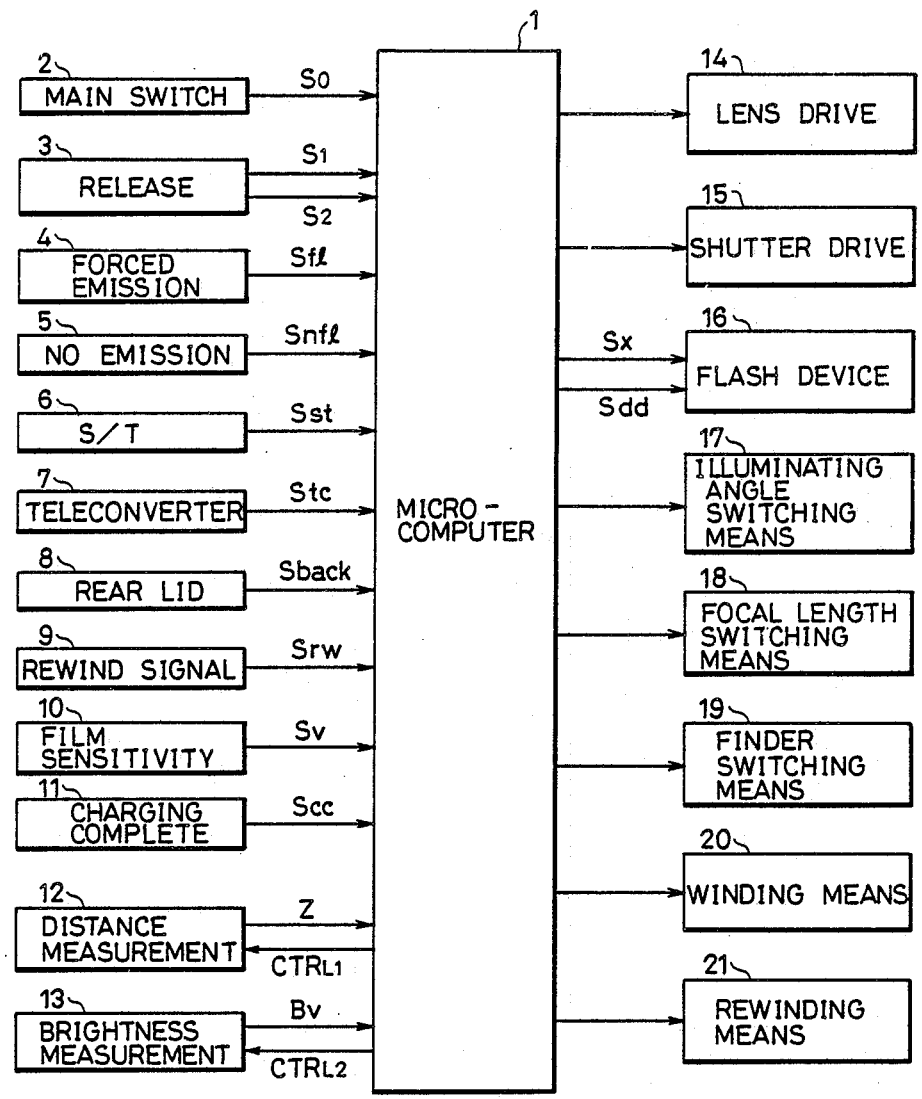
FIG. 1 is a block diagram showing the overall construction of a camera according to an embodiment of this invention.

FIG. 1 is an overall block diagram of the camera according to a first embodiment of this invention.

A microcomputer 1 controls all the actions of the camera.

A main switch sensor 2 outputs a signal $S_0$ to the microcomputer 1 when a main switch not shown is turned on. Photographing is allowable when this signal $S_0$ is outputted. A release signal generator 3 outputs a signal $S_1$ when a release button not shown is depressed to the stage of a first stroke and outputs a signal $S_2$ when said button is depressed to the stage of a second stroke which is longer than the first stroke. Therefore, whenever the signal $S_2$ is outputted, the signal $S_1$ is outputted. As will be described hereinafter, on receiving said signal $S_1$ the microcomputer 1 starts measuring brightness and measuring distance and, on receipt of signal $S_2$, performs a photographing action.

A forced emission signal output means 4 outputs a signal Sfl when a forced emission switch not shown is turned on. As will be described hereinafter, when the signal Sfl is outputted, the microcomputer 1 carries out phtographing with actuating a flash device 16 (flash photography) irrespective of the brightness condition of the photographing field. An emission prohibition signal output means 5 outputs a signal Snfl when an emission prohibition switch not shown is turned on. As will be described hereinafter, when the signal Snfl is outputted, the microcomputer 1 carries out photographing without triggering said flashlight device 16 (ambient light photography) irrespective of the brightness condition of the field.

A focal length switching signal output means 6 outputs a focal length switching signal Sst such as a pulse signal, synchronously as a focal length changing switch not shown turns on. In response to the input of this signal Sst, the microcomputer 1 feeds a signal to a focal length switching means 18 to change the focal length of the photographing lens and, at the same time, outputs signals to an illuminating angle switching means 17 and a finder switching means 19 to cause changes in illuminating angle and finder according to the new focal length. The switching means 17, 18 and 19 are all of the known types and will, therefore, be not described in detail. The pulse width of said signal Sst has been set to be shorter than the duration of time necessary for these switching actions and yet be somewhat long (for example, 0.1 second).

A teleconverter sensor means 7 continues to output a teleconverter-on signal Stc, while a teleconverter remains mounted on the camera.

A rear lid open-close sensor means 8 outputs a signal Sback indicative of whether the rear lid, not shown, of the camera is in open or closed condition. As will be described hereinafter, upon detection of a change in the position of the rear lid from the open to the closed position, the microcomputer 1 outputs a signal to a film winding means 20 to actuate an initial loading.

A rewind signal output means 9 outputs a rewind signal Srw when a tension is produced in the film after the last frame or when a rewind switch not shown turns on. As will be described hereinafter, in response to the signal Srw the microcomputer 1 outputs a signal to a film rewinding means 21 to actuate a film rewinding.

The switches, not shown, with which said means 2 through 6 and 9 are respectively equipped are not limited to mechanical switches but may be of any type, such as electrical switches (for example, touch switches) and optical switches (for example, photocouplers). The detection of the respective conditions by said teleconverter sensor means 7 and rear lid open-/close sensor means 8 may also be optional in type, for example, mechanical detection by means of a movable member, electrical detection utilizing electrical conductivity, and optical detection by means of photocouplers.

A film sensitivity reader means 10 reads the film sensitivity from the DX code on the film cartridge, converts it to an APEX value and feeds a film sensitivity information signal Sv to the microcomputer 1. Furthermore, this film sensitivity reader means 10 is provided with a manual operating member in such a manner that the outputted film sensitivity information Sv may be modified according to the intention of the photographer.

A charge sensor means 11 is adapted to detect whether a main capacitor, not shown, which is built in the flashlight device 16, has been charged to a voltage level necessary for a flashlight emission (for example, 300 V). When the main capacitor has been charged to the voltage level for flashlight to be emitted, the sensor means 11 outputs a charge complete signal Scc.

A distance measuring means 12 measures the photographing distance of the object in a plurality of distance measuring areas within the photographing field according to a control signal $CTRL_1$ from the microcomputer 1 and outputs distance data Z. A light measuring means by external measuring system 13 in response to a control signal $CTRL_2$ from the microcomputer 1, measures the brightness of the object in a plurality of brightness measuring areas within the photographing field and output brightness data Bv. The above two means 12 and 13 will hereinafter be described in greater detail.

A lens driving means 14 drives the photographic lens according to the output data from the microcomputer 1 for focus adjustment.

A shutter driving means 15, in response to an output signal from the microcomputer 1, opens or closes a shutter which doubles as diaphragm blades (not shown).

The flashlight device 16 emits a flashlight in response to a trigger signal Sx from the microcomputer 1 and controls a boosting circuit not shown in response to a boost control signal Sdd.

The means 14 through 21 are respectively well-known means and will, therefore, not be described in detail.

[Overall Control]

The actions of the microcomputer 1 are described below.

Figure 2A:
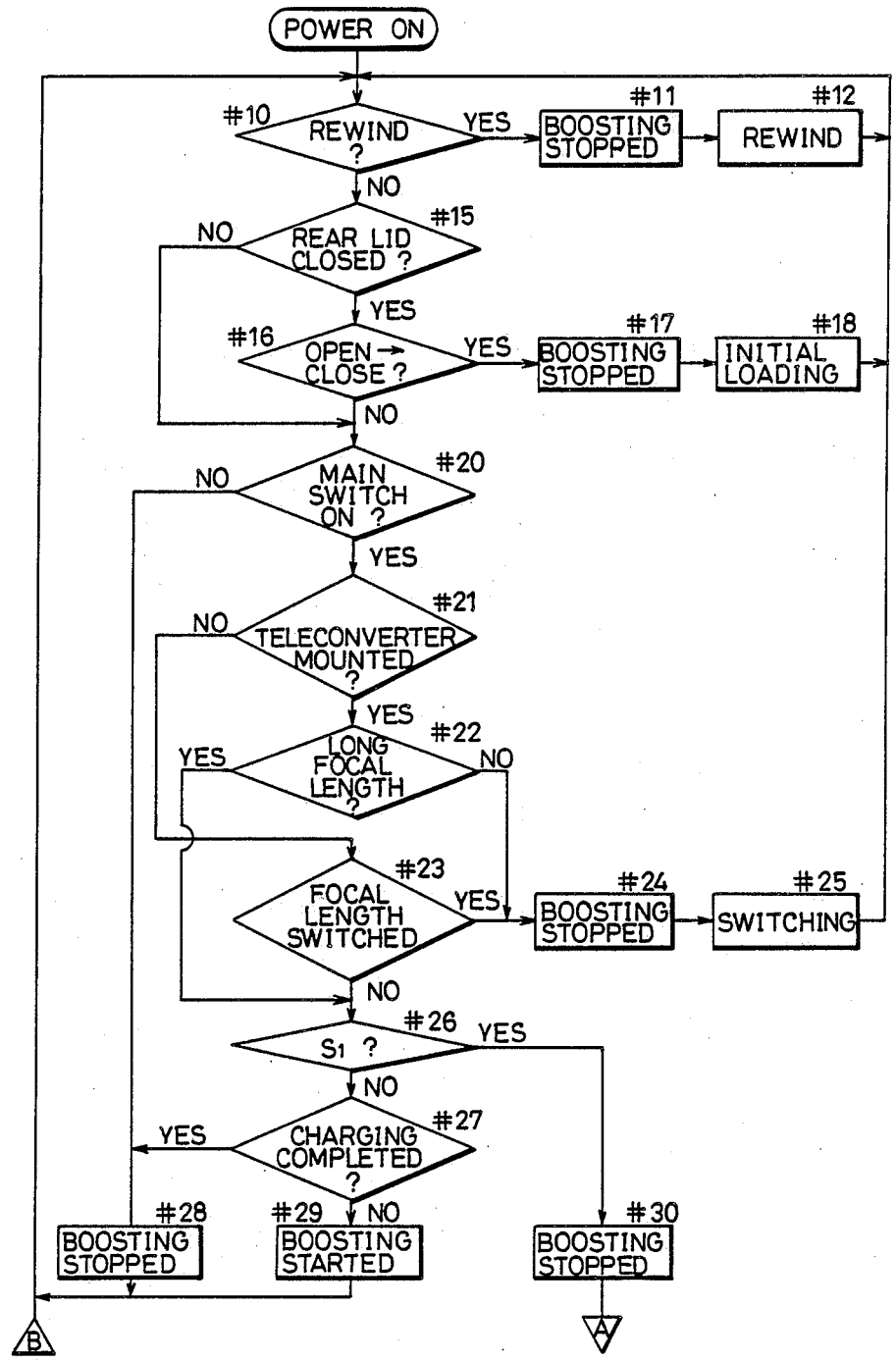
FIGS. 2A, 2B, and 2C comprise a flow showing the overall control system in the camera illustrated in FIG. 1.
Figure 2B:
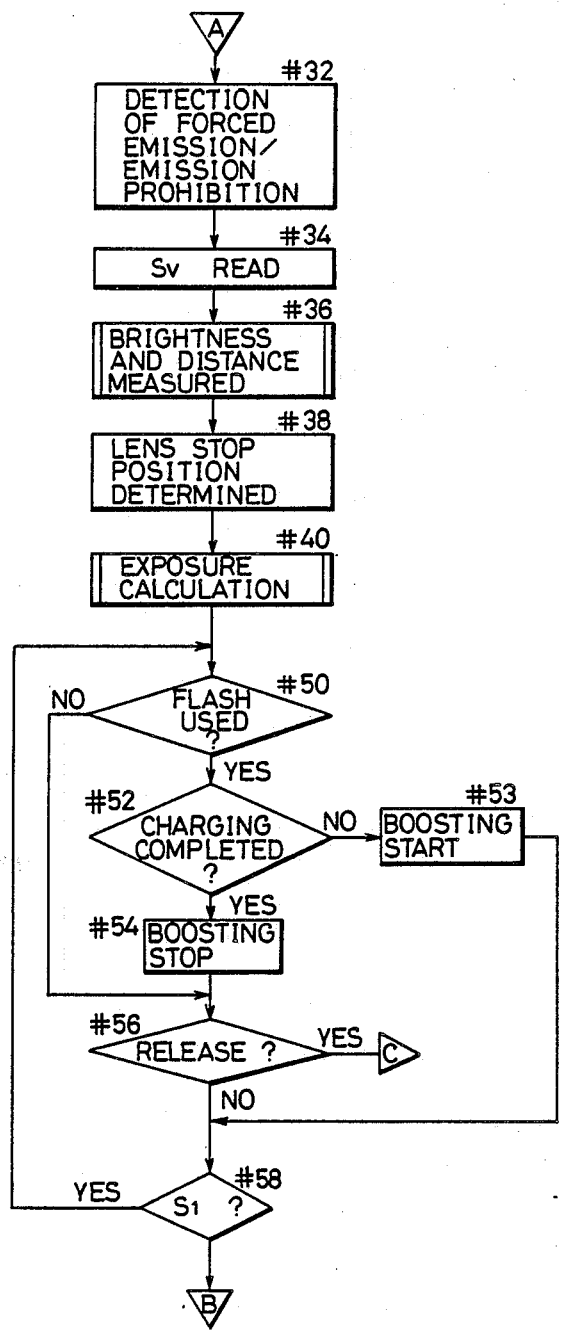
Figure 2C:
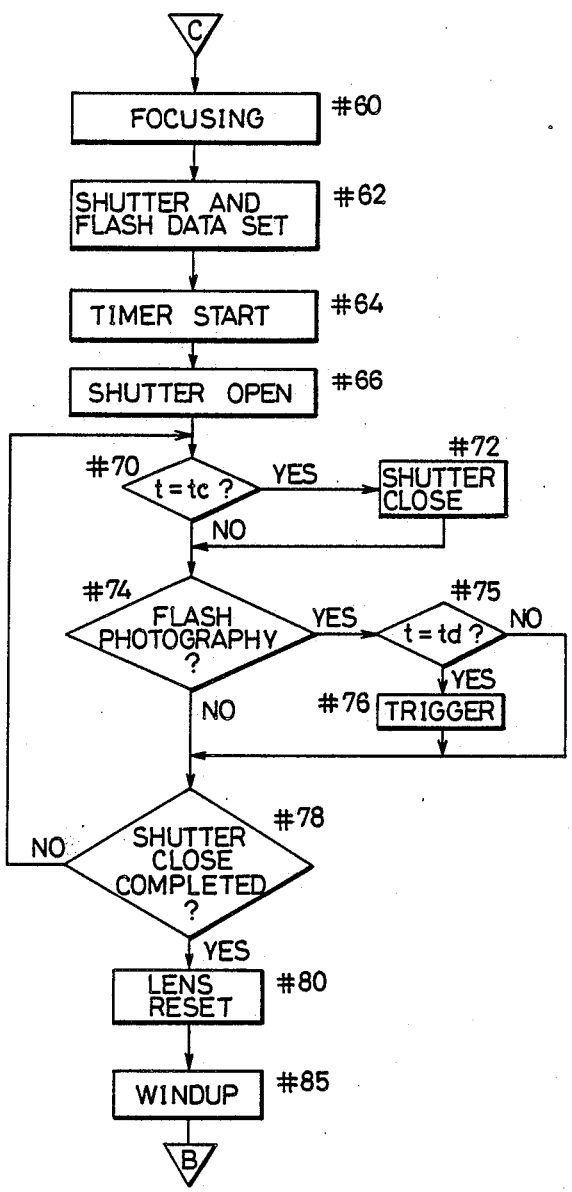

FIGS. 2A through 2C each is a flow chart showing the actions of the microcomputer 1. As the power source is switched on, the microcomputer 1 begins to function in accordance with the flow chart.

First, the microcomputer 1 makes an inquiry of whether the rewind signal Srw has been outputted (#10). If the signal Srw is outputted, the microcomputer 1 advances to step #11 and if it is not, the sequence proceeds to step #15. At step #11, in order to stop charging of the main capacitor, the microcomputer 1 outputs a boost control signal Sdd to stop the functioning of the booster circuit. Thereafter, it outputs a signal to the film rewinding means 21 to actuate a rewinding of the film (#12) and the microcomputer 1, then, returns to step #10.

At step #15, the microcomputer 1 makes an inquiry of whether the rear lid is open or closed and if the rear lid is open, the sequence proceeds to step #20. If it is closed, the sequence proceeds to step #16. At step #16, the microcomputer 1 makes an inquiry of the previous condition of the rear lid and if the rear lid was previously open, judges that the rear lid has just been closed and advances to step #17. Otherwise, the sequence proceeds to step #20. At step #17, as at step #11, the microcomputer 1 stops the booster circuit and advances to step #18 and outputs a signal to the film winding means 20 to actuate an initial loading. Then, the sequence returns to step #10.

At step #20, the microcomputer 1 checks the condition of the main switch. If a signal So is outputted, the microcomputer 1 advances to step #21. If a signal $S_0$ is not outputted, it advances to step #28.

At step #21, the microcomputer 1 makes an inquiry of whether a teleconverter has been mounted or not. If a signal Stc is outputted, it advances to step #22. If the signal Stc is not outputted, the microcomputer 1 proceeds to step #23. At step #22, the microcomputer 1 checks the focal length of the photographing lens and advances to step #24 if the focal length is short (38 mm) or to step #26 if it is long (80 mm). Thus, in the camera according to this embodiment, when a teleconverter is mounted, the focal length of the photographing lens is always set on the longer side (80 mm). (As will be explained hereinafter, as the sequence proceeds to step #24, the focal length of the lens is switched at step #25). In short-focal-length photographing, the photographic angle of view is widened as compared with long-focal-length photographing. Therefore, as a camera is fitted with the teleconverter, there may arise an eclipse of the field. Since the camera according to this embodiment is always set for long-focal-length photographing whenever it is fitted with a teleconverter, there is no problem of an eclipse due to the mounting of the teleconverter.

At step #23, the microcomputer 1 checks the condition of a focal length switch (not shown) and advances to step #24 if a signal Sst is outputted or to step #26 if the signal is not outputted. At step #24, just as at step #11, the microcomputer 1 stops the booster circuit. Then, the sequence proceeds to step #25, where the microcomputer 1 outputs a signal to each of the flashlight allocation switching means 17, focal length switching means 18 and finder switching means 19 to change the illuminating angle, focal length and finder settings. Thereafter, the microcomputer 1 returns to step #10 and continues to execute the program. As mentioned previously, the signal Sst is adapted to disappear when the program reaches this step again, so that even if the focal length changing switch is kept ON, it will not happen that the focal length switching action takes place continuously.

There may be provided a flag (referred to as Fst for convenience) which is set immediately after a switching of focal length so that an inquiry of whether the flag Fst has been set or not may be made in the course of advancing from step #23 to step #24. Then, if the flag Fst is set, the sequence skips, over step #24 and #25, to step #10. If the flag Fst is not set, the flag Fst is set and the microcomputer 1 then advances to step #24. However, if the signal Sst is not outputted at step #23, the microcomputer 1 resets the flag Fst and then advances to step #26. In this case, it may be so arranged that the focal length switching signal output means 6 continues to output the signal Sst while the focal length changing switch not shown remains ON.

At step #26, the microcomputer 1 checks whether the signal $S_1$ is outputted or not and advances to step #30 if the signal $S_1$ is outputted or to step #27 if the signal $S_1$ is not outputted. At step #27, the microcomputer 1 checks the charged state of the main capacitor and advances to step #28 if the main capacitor has been charged to the above-mentioned voltage level and the signal Scc is outputted, or to step #29 if the charging is not complete and the signal Scc is not outputted.

At step #28, just as at step #11, the microcomputer 1 stops the booster circuit and, then, returns to step #10. At step #29, the microcomputer 1 outputs a signal Sdd to actuate the booster circuit and charge the main capacitor. Then, it returns to step #10.

If, at step #26, the signal $S_1$ is found to be outputted, that is to say the release button not shown has been depressed to the stage of the first stroke, the microcomputer 1 advances to step #30, where it stops the booster circuit and then advances to step #32 (FIG. 2B). At step #32, the microcomputer 1 checks and stores the condition of the forced emission switch and that of emission prohibition switch, both not shown, and then advances to step #34.

Figure 18:
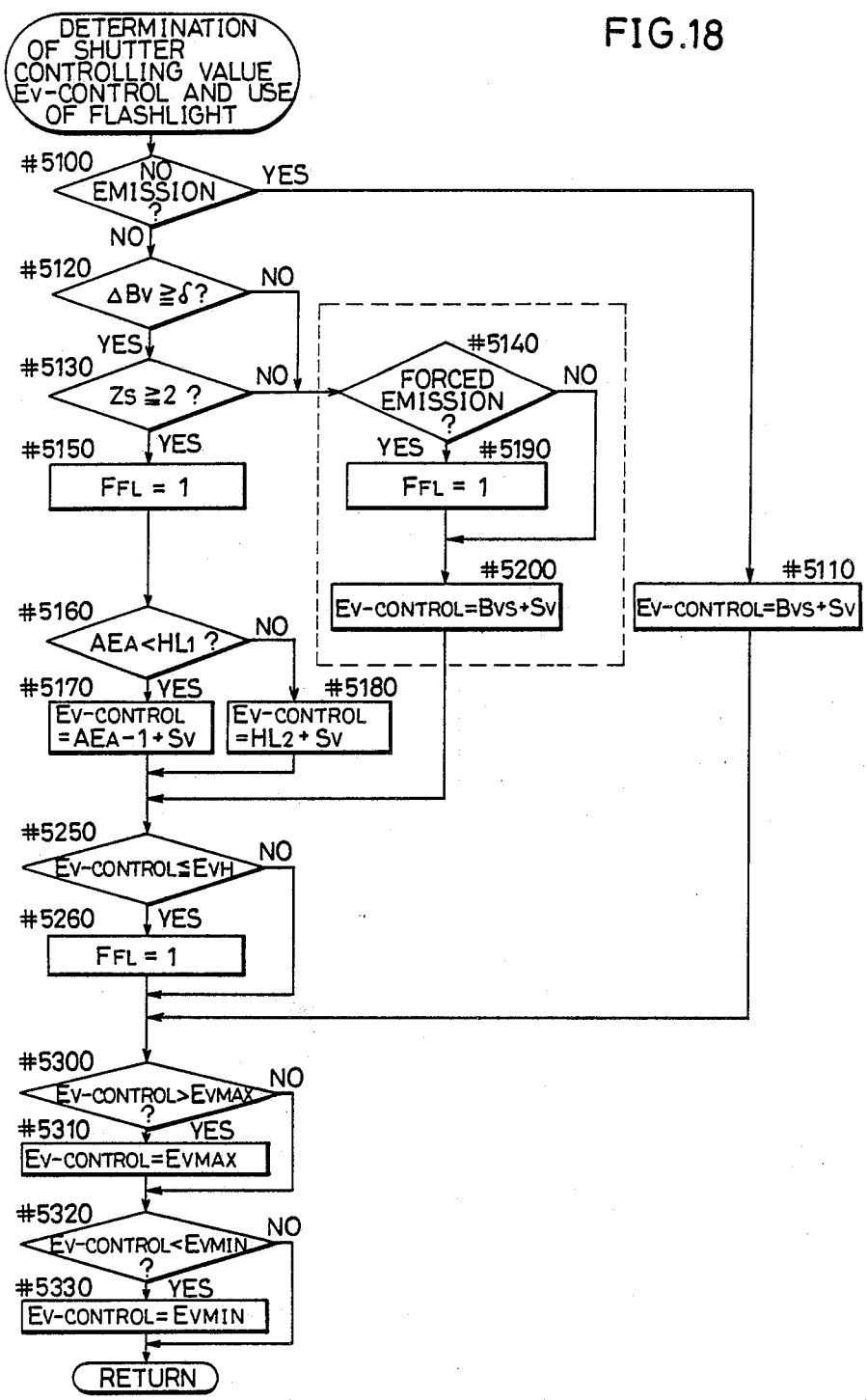
FIG. 18 is a flow chart showing the method of determining the shutter controlling value and the use-of-flashlight judgement in the camera according to the former embodiment of this invention.

As will be explained hereinafter, in the camera according to this embodiment, it is checked whether the emission prohibition signal Snfl has been outputted in advance of the forced emission signal Sfl (FIG. 18). Therefore, if the photographer inadvertently and concurrently turns both the forced emission switch and the emission prohibition switch ON, ambient light photographing prevails. Since it is generally more frequent to take pictures with forced flashlight emissions (for example, daylight synchro-flash photography) than taking pictures under prohibition of flashlight emission, it may be so programmed that when the signals Sfl and Snfl have both been outputted, it is assumed that the photographer has inadvertently switched the emission prohibition switch ON in selecting the forced emission mode. Thus, it may be so arranged that on the assumption that only the forced emission signal Sfl is outputted and the emission prohibition signal Snfl is not outputted, the condition of the forced emission switch and that of the emission prohibition switch are stored.

At step #34, the microcomputer 1 receives a film sensitivity information Sv from the film sensitivity reader means 10. Then, it advances to step #36 to execute the measurement of brightness and distance and, then, to step #38.

At step #38, based on a plurality of distance data Z, the microcomputer 1 determines a lens stop position Zs corresponding to the photographing distance of the object. Then, the microcomputer 1 advances to step #40 and performs an exposure calculation based on the plurality of distance data Z, the lens stop position value and the plurality of brightness data Bv to determine shutter and flash control values. The above three steps #36, #38 and #40 will be described in detail hereinafter.

After completion of the exposure calculation at step #40, the microcomputer 1 judges whether or not a flashlight emission is necessary or not according to the result of the calculation (#50). If a flashlight emission is necessary, the microcomputer 1 advances to step #52 to check the charged condition of the main capacitor and if the charging of the capacitor is complete, advances to step #54 to stop the booster circuit and, then, goes to step #56. Conversely, if the charging of the main capacitor has not been completed, the microcomputer 1 advances to step #53 to actuate the booster circuit and, then, to step #58 (Thus, if the charging is incomplete, the shutter release is prohibited). It should be understood that a warning of incomplete charge may be interposed after step #53. On the other hand, if a flashlight emission is found to be unnecessary in step #50, the microcomputer goes to step #56.

At step #56, the microcomputer 1 checks whether the signal $S_2$ is outputted, that is to say whether the photographer has depressed the release button, not shown, to the stage of the second stroke to cause a photographing action. If the signal $S_2$ is outputted, the microcomputer 1 advances to step #60 (FIG. 2C) to cause a photographing action.

If it is judged in step #56 that the signal $S_2$ is not outputted, the microcomputer 1 goes to step #58 and checks whether the signal $S_1$ is outputted or not, that is to say whether the release button not shown is remaining depressed down to the stage of the first stroke. The microcomputer 1 returns to step #50 if the signal $S_1$ is outputted or to step #10 if the signal $S_1$ is not outputted. Therefore, in the camera according to this embodiment, the release button not shown is held depressed to the stage of the first stroke to effect focus lock and AE lock.

After detecting at step #56 that the signal $S_2$ is outputted, the microcomputer 1 goes to step #60, where a focus adjustment is first made. Thus, the microcomputer 1 outputs a signal to the lens driving means 14 to shift out the lens to the lens stop position determined at step #38.

Furthermore, based on the shutter and flash control data determined in step #40, the microcomputer 1 sets the time tc when the shutter is to be closed and the time td when flashlight is to be emitted (#62). It should be understood that the time td is not set in ambient light photography. The microcomputer then resets the built-in timer to cause it to start counting (#64) and outputs a shutter open signal to the shutter driving means 15 to initiate a shutter opening action (#66).

After causing the shutter opening action to begin, the microcomputer 1 checks whether the counting time t of the timer is equal to the above-mentioned time tc (#70). If t=tc, the microcomputer 1 outputs a shutter close signal to the shutter driving means 15 to cause the 0 shutter to begin to close (#72) and, then, advances to step #74. If t≠tc, the sequence skips to step #74. At step #74, the microcomputer 1 inquires whether it is flash photography, and goes to step #75 if the answer is flash photography or skips to step #78 if it is ambient light photography. At step #75, the microcomputer 1 checks whether the counting time t of the timer is equal to said time td or not. If t=td, the microcomputer 1 outputs a trigger signal Sx to the flashlight device 16 to cause a flashlight emission (#76) and advances to step #78. If the judgement is t≠td, the sequence skips to step #78.

At step #78, the microcomputer 1 judges whether the closure of the shutter has gone to completion. This judgement is made by detecting whether the counting time t of the timer has reached 2tc+α (α is a predetermined value). Alternatively, a switch adapted to be turned ON upon completion of closure of the shutter may be provided and the condition of this switch detected. The microcomputer returns to step #70 if it is judged that the closure of the shutter remains not to be completed, or advances to step #80 if the closure of the shutter has been completed.

It has been mentioned just above that the microcomputer 1 judges, in steps #70 and #75, whether t=tc or t=td but strictly speaking, the microcomputer 1 judges that t=tc and t=td when the condition of t≧tc and t≧td was established. Therefore, once the microcomputer 1 outputs a shutter close signal and a trigger signal Sx, it will not output the shutter close signal or the trigger signal Sx again. Furthermore, strictly speaking, the microcomputer 1 may output the shutter close signal and trigger signal Sx upon lapse of time t which is t>tc, t>td. However, the operation speed of the microcomputer 1 is fast enough and the accuracy of the time is also high enough to enable the error in the above judgement to be disregarded.

Advancing to step #80 after completion of shutter closure, the microcomputer 1 outputs a signal to the lens driving means 14 to shift the lens into the initial position. The microcomputer 1 then outputs a signal to the film winding means 20 to wind the film by one frame (#85). Then, either upon completion of film winding by one frame or lapse of a predetermined time (a time a little longer than the time required for winding the film by one frame; for example 3 seconds) from the beginning of winding (which means that the film has become taut at the last frame and the signal Srw is outputted from the signal output means 9), the microcomputer 1 returns to step #10.

The foregoing is the overall control system for the camera according to this embodiment.

In this embodiment, photographing takes place continuously while the release button not shown is kept depressed to the stage of the second stroke but it may be so re-arranged that a step of checking the signal $S_1$ is provided after step #85 and the return to step #10 takes place only when the signal $S_1$ has ceased to be outputted. A means for changeover from continuous photographing to single photographing or vice versa may be provided so that the sequence may unconditionally return from step #85 to step #10 in continuous photography while it may return to step #10 only upon stoppage of the output of signal $S_1$ in single photography. In this case, it may be so arranged that, for continuous photography, a switchover to ambient light photographing invariably takes place.

Moreover, although, in the above embodiment, a release lock is perpetuated in flash photography unless the charging of the main capacitor is complete, it may be so arranged that the sequence proceeds from step #53 to step #56 so that a photographing action may take place in flash photography even if the charging of the main capacitor has not been completed. Even if such modification be made, the probability of inadequate exposure is extremely low in the camera of this embodiment because the charging of the main capacitor is performed at all times while the main switch (not shown) is kept ON as mentioned hereinbefore.

[Measurement of Brightness and Distance]

<Brightness Measurement>

Figure 3:
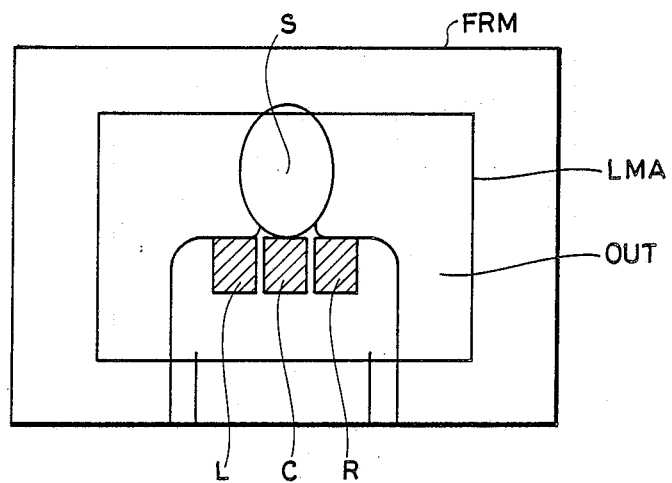
FIG. 3 is a diagrammatic representation of the brightness measuring range of brightness measuring means in the camera illustrated in FIG. 1.

FIG. 3 is a diagrammatic representation of the brightness measuring range of the light measuring means 13. As shown, there are 3 spot distance measuring areas L, C and R in the approximate center of the photographing field FRM and one peripheral brightness measuring area OUT surrounding them. These four areas L, C, R and OUT constitute a brightness measuring area LMA, and light receiving means not shown in the light measuring means 13 receive the light incident on the respective areas L, C, R and OUT independently. The brightness value of light received by each light receiving means is converted to an electrical quantity and subjected to logarithmic compression and outputted as an APEX value Bv to the microcomputer 1. Incidentally, the specific circuit construction of the light measuring means is well-known and will, therefore, be not described.

It will also be apparent from FIG. 3 that chiefly the light from a main object S is incident on distance measuring areas L, C and R, while chiefly the light from the background is incident on the peripheral distance measuring area OUT.

Although, in this embodiment, only one area is provided for incidence of, chiefly, background light, this peripheral area OUT may be divided into a plurality of subareas. For example, as disclosed in Japanese Patent Laying-Open No. 279829/1986, the peripheral area may be divided into 4 areas and the sum of brightness data for the respective areas be taken as the brightness data of the peripheral area. Moreover, while three distance measuring areas are provided for the incidence of light chiefly from the main object S in this embodiment, the number of central areas may be two or not less than 4.

<Distance Measurement>

Figure 4:
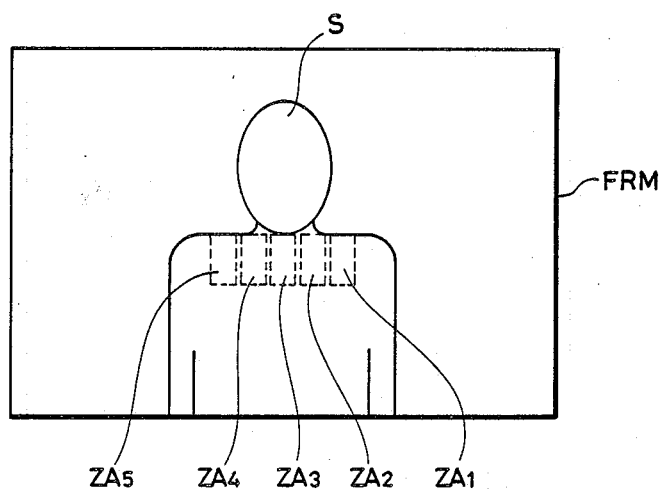
FIG. 4 is a diagrammatic representation of the distance measuring range of the distance measuring means in the camera illustrated in FIG. 1.

FIG. 4 is a diagrammatic representation of the distance measuring areas of the distance measuring means 12. As shown, there are five distance measuring areas $ZA_1$ through $ZA_5$, arranged in a transverse row, in the approximate center of the photographing range FRM. The distance measuring means 12 measures the photographing distances of the objects within these five distance measuring areas by the well-known active method. And the distance measuring means 12 detects which of the distance zones of Table 1 corresponds to the measured photographing distance and outputs the zone number as distance data Z to the microcomputer 1.

The detailed construction of the distance measuring means 12 is disclosed in the copending U.S. patent application Ser. No. 302,838 filed on Jan. 27, 1989, and will, therefore, be not described in this specification. Of course, the known active system distance measuring means may likewise be employed.

\<Control\>

Figure 5:
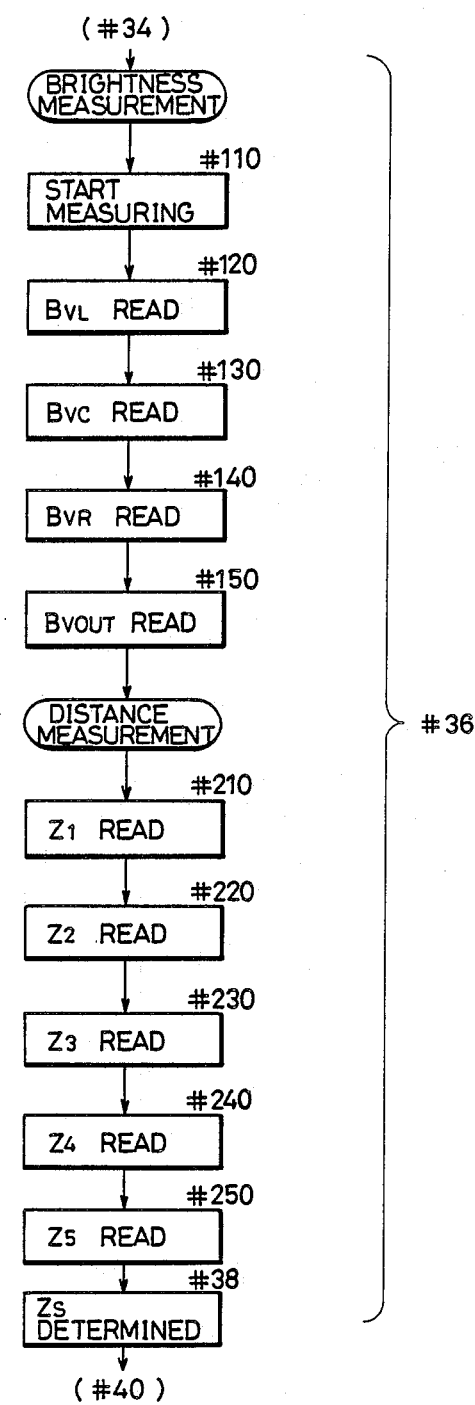
FIG. 5 is a flow chart showing a system for control of brightness measuring and distance measuring actions in the camera illustrated in FIG. 1.

FIG. 5 is a flow chart showing specific examples of steps #36 and #38 in the flow chart shown in FIG. 2B.

First, the microcomputer 1 outputs a control signal $CTRL_2$ to the light measuring means 13 to initiate a brightness measuring action (#110). The microcomputer 1 then reads brightness data Bvl, Bvc, Bvr and Bvout in the respective distance measuring areas L, C, R and OUT (#120 through #150).

Then, the microcomputer 1 outputs a control signal $CTRL_1$ to the distance measuring means 12 to measure the photographing distances of the objects within the distance measuring areas $ZA_1$ and read the distance data $Z_1$ (#210). Similarly, the microcomputer 1 reads the distance data $Z_2$, $Z_3$, $Z_4$ and $Z_5$ in the distance measuring areas $ZA_2$, $ZA_3$, $ZA_4$ and $ZA_5$, respectively (#220–#250).

The foregoing is a specific example of step #36.

The microcomputer 1 then detects the shortest of the distance data $Z_1$ through $Z_5$, that is to say the data with the largest zone number, and stores this zone number in a register Zs (which shows the lens stop position) (#38). Therefore, in this embodiment, focus adjustment is made with respect to the object with the shortest photographic distance (closest object).

The distance data $Z_1$ through $Z_5$ in the respective distance measuring areas $ZA_1$ through $ZA_5$ include measurement errors. In the camera according to this embodiment, the distance measuring means 12 is adjusted with the central distance measuring area $ZA_3$ as a reference and the outputs of the other distance measuring areas $ZA_1$, $ZA_2$, $ZA_4$ and $ZA_5$ have errors of about ±2, at the maximum, in terms of distance zone number with respect to the output of distance measuring area $ZA_3$. Even with the same object (objects at equal photographing distances), the outputs of respective distance measuring areas $ZA_1$ through $ZA_5$ may for example be:

$Z_1 = 12$
$Z_2 = 11$
$Z_3 = 10$
$Z_4 = 11$
$Z_5 = 12$.

In other words, assuming, for instance, that the outputs of respective distance measuring areas $ZA_1$ through $ZA_5$ are:

$Z_1 = 6$
$Z_2 = 5$
$Z_3 = 5$
$Z_4 = 4$
$Z_5 = 4$, the true photographing distances may for example be:

$Z_1 = 4$
$Z_2 = 4$
$Z_3 = 5$
$Z_4 = 3$
$Z_5 = 2$.

Therefore, in the camera according to this embodiment, when the differences among respective distance data are small, priority is given to the output of the central distance measuring area $ZA_3$. To be specific, if each of the differences of distance data $Z_1$, $Z_2$, $Z_4$, and $Z_5$ in the areas $ZA_1$, $ZA_2$, $ZA_4$ and $ZA_5$ from the distance data $Z_3$ in the central area $ZA_3$ is within 2, the distance data in the area showing the shortest distance ($Z_1$ in the above example) is not used as the lens stop position but the distance data $Z_3$ in the central area $ZA_3$ is adopted as the lens stop position. By this arrangement, the distance measuring errors can be minimized.

[Exposure Calculation]

Now, a specific example of the step #40 (exposure calculation) shown in FIG. 2 is described below.

\<Summary\>

Figure 6:
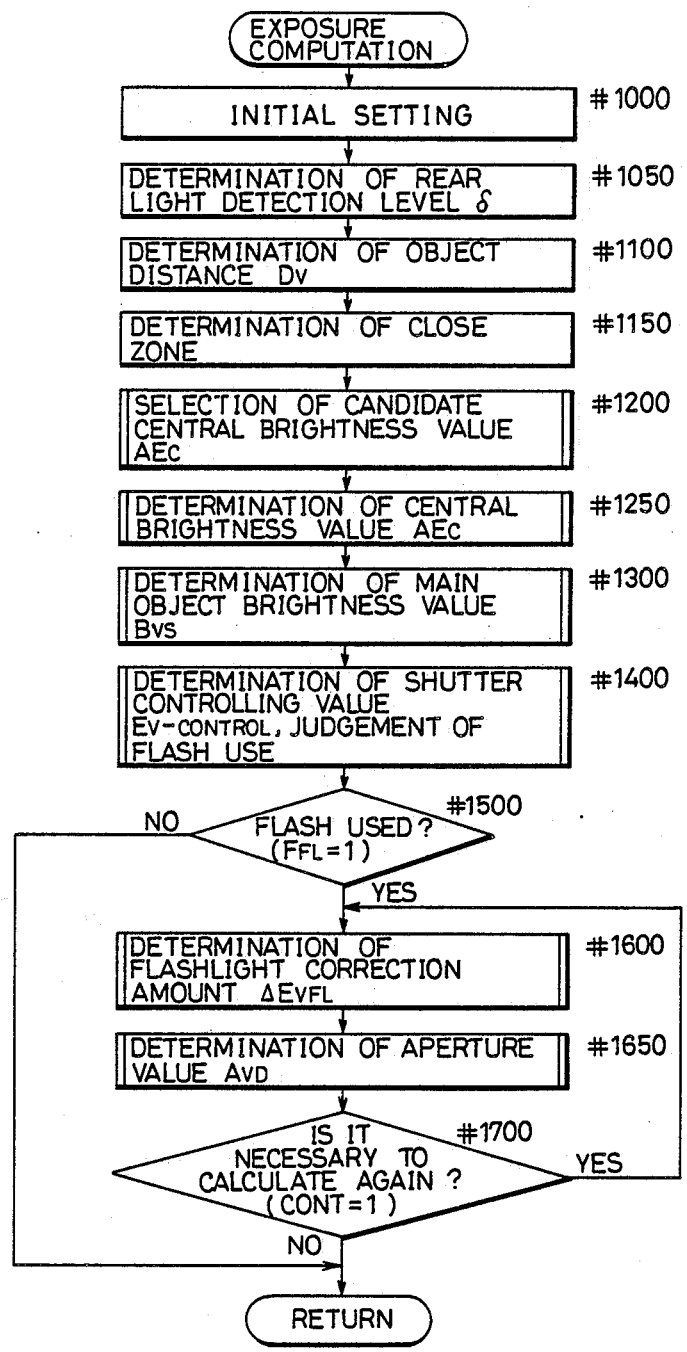
FIG. 6 is a flow chart showing the overall control of exposure calculation action in the camera illustrated in FIG. 1.

FIG. 6 is a summarized flow chart of the exposure calculation routine involved. Arriving at this routine, the microcomputer 1 performs the initial setting of flags, etc. (#1000). Then, based on the brightness data (Bvout etc.) obtained in step #36, the microcomputer 1 determines a rear light detection level δ(#1050). Thereafter, the microcomputer 1 determines a photographing distance from AF data (lens stop position) Zs and stores its APEX value in a register Dv (#1100). The microcomputer 1 then delimits a close zone (to be described below) (#1150). Then, based on distance data $Z_1$, $Z_2$, $Z_3$, $Z_4$, $Z_5$ and AF data Zs, the microcomputer 1 selects, from among brightness data Bvl, Bvc, Bvr, the data for determination of the central area brightness value AEc (#1200) and calculates the brightness value AEc (#1250). Thereafter, the microcomputer 1 determines brightness value of the main object Bvs (#1300). The microcomputer 1 then determines the shutter controlling value Ev-control, and, at the same time, judges whether flashlight is to be used or not and sets the flag Ffl (#1400). The microcomputer 1 then checks which of flash photography (Ffl =1) and ambient light photography (Ffl =0) is to take place (#1500), and returns to the main program (FIG. 2B) if ambient light photography is to take place while it advances to step #1600 if flash photography is to take place. At step #1600, the microcomputer 1 determines the flashlight correction amount ΔEvfl and thereafter calculates the aperture value Avd indicative of the timing of flashlight emission (#1650). The microcomputer 1 then evaluates whether a repetition of calculation is necessary (#1700). The microcomputer 1 advances to step #1600 if a repetition of calculation is necessary or return to the main program (FIG. 2B) if it is not necessary.

\<Description of the Respective Steps\>

The respective steps in the flow chart given in FIG. 6 are described in detail below.

Initial Setting

In this step, the microcomputer 1 resets the flashlight use flag Ffl and a shift counter SHIFT (to be described hereinafter) and sets a flashlight emission value Iv, maximum aperture value (an aperture value corresponding to the minimum aperture of diaphragm) Avmax, full open aperture value Avo, the maximum value EVmax and minimum value EVmin of the range where the shutter can be controlled, camera shake limit value Evh, predetermined brightness values $HL_1$, $HL_2$ ($HL_1 > HL_2$) (to be described hereinafter), shift amount e (to be described hereinafter) and shift upper limit number M (to be described hereinafter). These values (exclusive of shift upper limit number M) are expressed as APEX values unless otherwise indicated.

The above values vary with the focal length of the photographing lens. For example, in photography with a lens of long focal length, as contrasted to photography with a lens of short focal length, the camera shake limit value Evh, indicative of the limit value of no shake, is larger. Moreover, the full open aperture value Avo of the photographing lens is altered by switching of focal length and this is accompanied by changes in maximum aperture value Avmax and the maximum Evmax and minimum Evmin values of the range of shutter control. Therefore, the microcomputer 1 sets these parameters according to the focal length of the photographing lens. When a teleconverter is mounted, the focal length of the photographing lens is always set on the longer focal length side as previously mentioned. On the other hand, the full open aperture value of the photographing lens etc. are not altered by mounting of the teleconverter. Therefore, when the teleconverter is mounted, the abovementioned parameters are set to the same values as for photography with a lens of long focal length.

Furthermore, when the signal Snfl is not outputted and the flashlight emission has not been prohibited, the minimum value Evmin of the range of shutter control is replaced by the camera shake limit value Evh. Therefore, no camera shake takes place in flash photography.

Determination of Rear Light Detection Level $\delta$

As will be described hereinafter, in the camera according to this embodiment, the difference between the brightness data AEa in the peripheral area and that AEc in the central area is compared with the rear light detection level $\delta$ to detect whether the brightness condition is rear light or not. This method of detecting rear light is well-known but since a fixed rear light detection level is used in the prior art camera, the following problems have been pointed out.

In the camera employing an external metering system which does not use the light passing through a photographing lens, of which the camera according to this embodiment is an example, the distance measuring area is fixed, irrespective of the focal length of the lens. Therefore, with the image magnification being fixed, that is to say when the proportion of the object S in the area FRM is constant, a change in focal length of the lens results in a change in the area LMA relative to the photographic field.

Figure 7A:
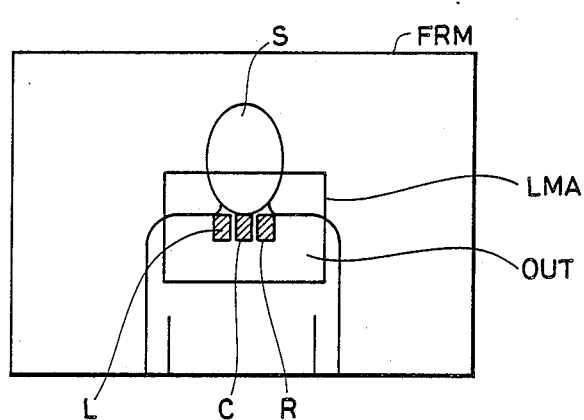
FIG. 7 A is a diagrammatic representation of the brightness measuring range in standard photographing with a constant image magnification in the camera illustrated in FIG. 1.
FIG. 7B is a diagrammatic representation of the brightness measuring range in telephotographing condition with a constant image magnification in the camera illustrated in FIG. 1.
FIG. 7C is a diagrammatic representation of the brightness measuring range in teleconverter photography with a constant image magnification in the camera illustrated in FIG. 1.
FIG. 7D is a diagrammatic representation of the brightness measuring range in telephotography at a long distance in the camera illustrated in FIG. 1.
FIG. 7E is a diagrammatic representation of the brightness measuring range in telephotography at a medium distance in the camera illustrated in FIG. 1.
FIG. 7F is a diagrammatic representation of the brightness measuring range in telephotography at a short photographing distance in the camera illustrated in FIG. 1.
Figure 7B:
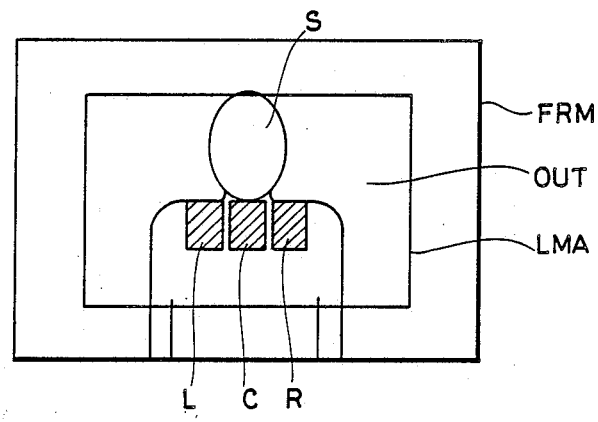
Figure 7C:
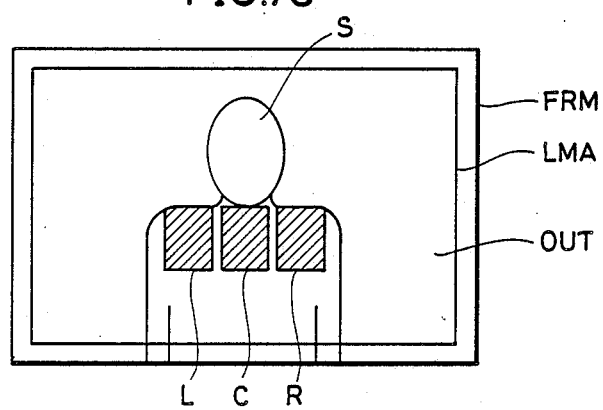
Figure 7D:
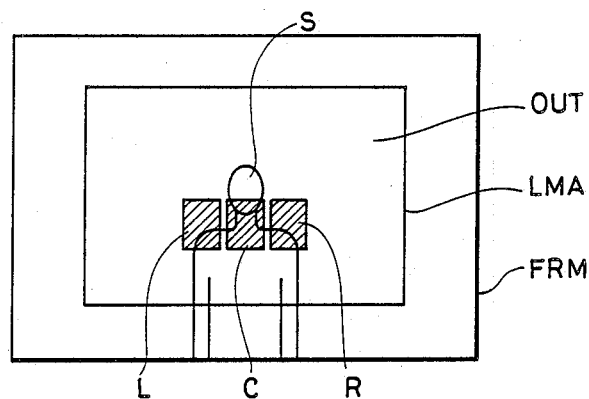
Figure 7E:
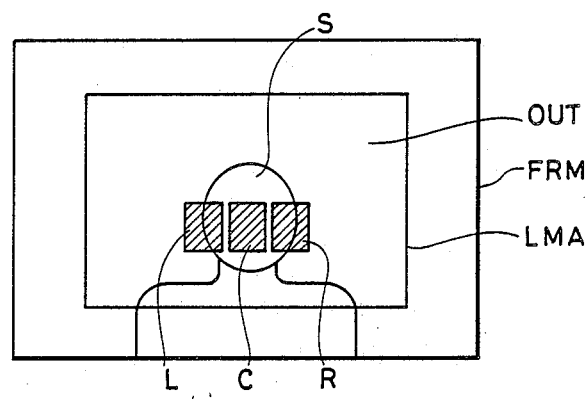
Figure 7F:
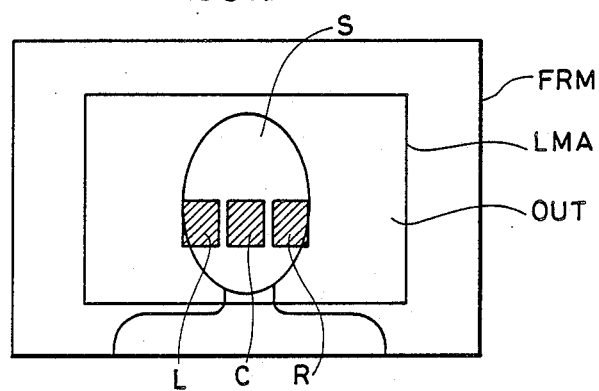

The above will be a little elaborated on with reference to FIGS. 7A through 7F. FIG. 7A represents short-focal-length (standard) photography, FIG. 7B long-focal-length photography (telephotography), and FIG. 7C photography with a teleconverter, assuming the same image magnification. FIGS. 7D, 7E and 7F represent telephotography at different photographing distances, with the photographing distance being longer in the case of FIG. 7E than in the case of FIG. 7D, and in the case of FIG. 7F than in the case of FIG. 7E.

As will be apparent from FIGS. 7A through 7C, the distance measuring area LMA is narrower in standard photography than in telephotography. Therefore, in standard photography, the proportion of the main object S in the peripheral distance measuring area OUT is larger than in telephotography. Consequently the difference between the brightness data AEa in the peripheral distance measuring area out and the brightness data AEc in the central distance measuring area becomes smaller in standard photography than in telephotography.

The distance measuring area LMA is larger in photography with a teleconverter than in telephotography. Therefore, in photography with a teleconverter, the proportion of the main object S in the peripheral distance measuring area OUT is smaller than in telephotography. Consequently, the difference between the peripheral brightness value AEa and the central brightness value AEc is larger in teleconverter photography than in telephotography.

Furthermore, as will be apparent from FIGS. 7D through 7F, even in the same photographing situation (whether in telephotography, standard photography or teleconverter photography), an increase in the distance of the main object (photographing distance) results in a decrease in the proportion of the main object S in the distance measuring area LMA and in the proportion of the main object S in each of the central distance measuring areas L, C and R. Therefore, the central brightness value AEc becomes influenced by background brightness, with the difference between the peripheral brightness value AEa and the central brightness value AEc being decreased.

Furthermore, even when the central distance measuring areas L, C and R are completely covered with the main object and no light from the background is incident on these areas L, C and R, the brightness data Bvl, Bvc and Bvr in the distance measuring areas L, C and R may be affected by background brightness because of cross talk among the respective photosensor elements. This influence of interelement cross talk is particularly remarkable when a light source such as the sun exists within the peripheral distance measuring area OUT to give a high background brightness.

From the above considerations, the rear light detection level $\delta$ is preferably adjusted according to the focal length of the lens (type of photography), main object distance, and peripheral brightness. Therefore, in the camera according to this embodiment, the rear light detection level $\delta$ is given as the function of the focal length of the photographic lens, main object distance (photographing distance) and background brightness, as follows:

$\delta = \delta$ (focal length, photographing distance, background brightness).

It should be understood that the peripheral brightness data AEa is equal to the brightness value Bvout in the peripheral distance measuring area OUT in the camera according to this embodiment but if the peripheral distance measuring area OUT is divided into a plurality of sub-areas, the average of brightness values Bvout in such plurality of peripheral sub-areas, the median value between the maximum (brightest) and minimum (darkest) values, or the average of such values exclusive of the maximum and minimum values can be taken as the peripheral brightness value AEa.

A specific example of rear light detection level $\delta$ is explained below with reference to FIG. 8.

Figure 8:
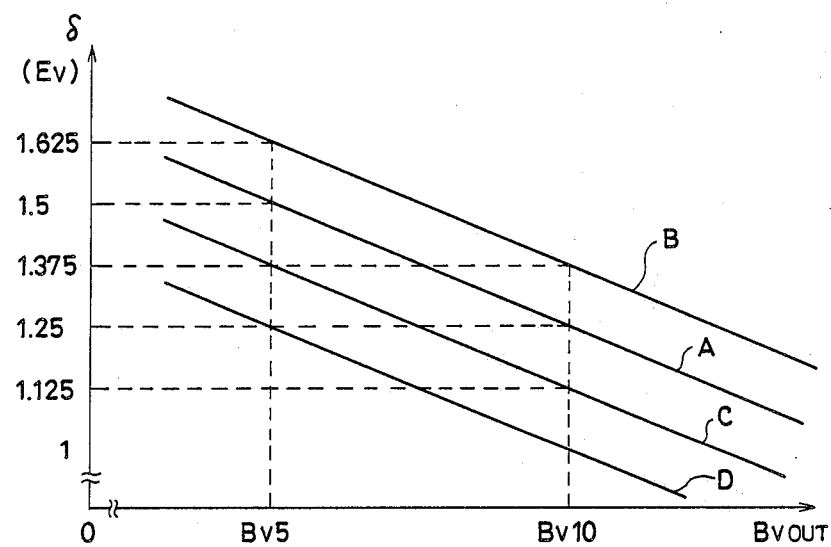
FIG. 8 is a graph illustrating the relationship between the measured brightness value of the peripheral area and the rear light detection level value in an embodiment of this invention.

FIG. 8 is a diagrammatic representation of the relation between background brightness Bvout and rear light detection level $\delta$, wherein A represents a reference value and B, C and D each represents a rear light detection level $\delta$ value corrected for focal length and main object distance. As will be apparent from FIG. 8, the reference value of rear light detection level $\delta$ is $\delta = 1.5$ Ev when the background brightness value Bvout is Bv 5 and $\delta = 1.25$ Ev when the Bvout value is Bv10. It is so designed, in this embodiment, that the reference value A is available in telephotography at a main object distance of not less than 1 m and less than 2 m.

It will also be apparent from FIG. 8 that in the camera according to this embodiment, the larger the background brightness value Bvout, the smaller is the value of rear light detection level $\delta$, so that even if the influence of cross talk is increased by the presence of a light source, such as the sun, in the background, a certain detection of rear light is insured. Thus, an increased background brightness Bvout results in a greater interference from cross talk and in a decreased difference between the peripheral brightness data AEa and the central brightness data AEc. Therefore, unless the rear light detection level δ is adjusted, an accurate rear light detection cannot be performed on the higher side of the brightness scale. However, when the rear light detection level δ is decreased on the higher brightness side as in this embodiment, an accurate rear light detection will be insured even if the interference by cross talk is increased.

Now, correction of the rear light detection level δ for a change in focal length of the lens is described below.

As mentioned previously, the difference between central brightness value AEc and peripheral brightness value AEa is smaller in standard photography than in telephotography and greater in teleconverter photography than in telephotography. Therefore, a certain rear light detection can be insured by decreasing the value of rear light detection level δ for standard photography and increasing it for teleconverter photography, with respect to the reference level A.

In the camera according to this embodiment, the rear light detection level δ is corrected to be smaller by 0.125 Ev than the reference value A for standard photography and larger by 0.125 Ev for teleconverter photography.

Now, correction of the rear light detection level δ for a change in main object distance is described below.

When the main object distance is extremely short (for example, less than 1 m), the brightness value AEa in the peripheral distance measuring area is decreased by the influence of the main object. The reason for this is as follows.

Since rear light detection is considered here, it is natural to assume that the brightness of the background is higher than the brightness of the main object. Therefore, a decrease in main object distance results in an increased proportion of the main object S in the peripheral distance measuring area OUT so that the brightness value AEa in this peripheral area is decreased. However, since the brightness data AEc in the central area corresponds to the main object brightness, the central brightness value AEc will not be altered even if the main object distance is decreased. Therefore, when the main object distance is extremely small, the difference between the central brightness value AEc and the peripheral brightness value AEa is smaller. Therefore, when the main object distance is extremely small, the value of rear light detection level δ is preferably small.

Conversely when the main object distance is long, the difference between the central brightness value AEc and the peripheral brightness value AEa is small as mentioned hereinbefore. Therefore, it is preferable to insure that the longer the main longer distance, the smaller is the value of rear light detection level δ.

Therefore, in the camera according to this embodiment, the δ value is corrected to be smaller by 0.125 Ev when the main object distance is not within the reference range ($\geq 1$ m, $<2$ m).

Thus, the relationship between the combination of each type of photography (standard, telephoto or teleconverter) with main object distance and the graphs (A, B, C and D) of rear light detection level δ shown in FIG. 8 are as presented in Table 2.

It should be understood that the method of determining the correction amount is not limited to the one described above but different absolute value may be used for plus and minus corrections or different values may be used for main object distances exceeding the reference range and those shorter than the range. Furthermore, amounts of correction may be established for more varied conditions or the relationship between background brightness value Bvout and value of rear light detection level δ may not be linear. Thus, optional procedures may be taken for the correction of rear light detection level.

In a camera of the TTL system in which light measuring is carried out using the light passing through the photographing lens, the proportion of the distance measuring area LMA with respect to the photographing range FRM is always fixed irrespective of the focal length of the photographing lens. Therefore, when the brightness is measured by TTL metering, the relative size of the main object with respect to the photographing range FRM varies according to the image magnification which is governed by the focal length of the photographing lens and the photographing distance (main object distance). Therefore, the level δ is given as the function of image magnification and background brightness.

$\delta = \delta$ (image magnification and background brightness).

Thus, taking, for instance, the image magnification at which the size of the main object is approximately equal to the size of the central distance measuring area being as a reference, the rear light detection level δ may be set to the level A shown in FIG. 8. When the image magnification is smaller than the above reference magnification value, the value of rear light detection level δ is set to C which is smaller than said reference value A (See FIG. 8) in consideration of the fact that, then, the central brightness value is affected by background brightness to a greater extent. Conversely when the image magnification is larger than said reference image magnification value, the proportion of the main object in the peripheral distance measuring area is increased and, therefore, the value of rear light detection level δ is established at C which is smaller than said reference level A.

Of course, the image magnification scale may be further divided and the rear light detection level more finely classified. Moreover, the amount of correction of rear light detection level from the reference level A may be optionally selected according to image magnification and background brightness value.

Determination of Object Distance Dv

At this step, the microcomputer 1 determines the APEX value (Dv) of distance to the main object. In the camera according to this embodiment, this value Dv is previously calculated and stored in a ROM. From this ROM, the microcomputer 1 reads a Dv value corresponding to AF data (lens stop position) Zs. In this connection, specific examples of distance zone, AF data (lens stop position) Zs and Dv value are shown in Table 1.

Determination of the Range of Close Zone

When distance is measured in each of a plurality of distance measuring areas as in the camera according to this invention, there are cases in which distance data varies from one measuring area to another even if the distance to the same object is measured. This variation occurs due to a scattering of errors in the respective distance measuring areas or due to the depth of the object field. Therefore, in the camera according to this embodiment, respective distance data are compared and even if the data are different, it is checked to see that what is being measured is actually the distance to the same object (In this embodiment it is assumed that the distance to the same object is being measured, when the data variation is within the range of error or the difference in distance is not more than 15 cm). In this specification, the range of distance zone which validates the assumption that the distance to the same object is being measured is defined as "the range of close zone".

The specific procedure for determining the range of close zone in the camera according to this embodiment is described below.

First, assume a first range of close zone which includes the lens stop position Zs and in which a scattering of distance data occurs according to errors of distance measurement. This range is expressed as a function of lens stop position Zs, as follows.

$$Zf_1(Zs) \sim Zn_1(Zs)$$

wherein $Zf_1(Zs)$ is the far side limit and $Zn_1(Zs)$ is the near side limit and the following relation holds.

$$Zf_1(Zs) \leq Zs \leq Zn_1(Zs).$$

Then, assume a second zone which includes the lens stop position Zs and in which a scattering of distance data occurs due to the depth of the object. As will be apparent from Table 1, the shorter the photographing distance (Zs is larger), the narrower is the range of distance zone. Therefore, the shorter the photographing distance, the larger is the variation in distance data. Therefore, this second zone is also expressed as a function of lens stop position Zs. Thus, the range of said second zone is expressed as:

$$Zf_2(Zs) \sim Zn_2(Zs)$$

wherein $Zf_2(Zs)$ and $Zn_2(Zs)$ are, as in the first zone, the far side limit and near side limit, respectively, and the following relation holds:

$$Zf_2(Zs) \leq Zs \leq Zn_2(Zs).$$

In the camera according to this embodiment, the sum of sets of the first and second zone is used as the range of close zone. Thus, the range of close zone in the camera according to this embodiment is as follows:

$$Zf(Zs) \sim Zn(Zs),$$
$$Zf(Zs) = \min [Zf_1(Zs), Zf_2(Zs)]$$
$$Zn(Zs) = \max [Zn_1(Zs), Zn_2(Zs)]$$

wherein min (a, b) and max (a, b) denote one of a and b which is not larger than the other and one of a and b which is not smaller than the other, respectively.

Figure 9:
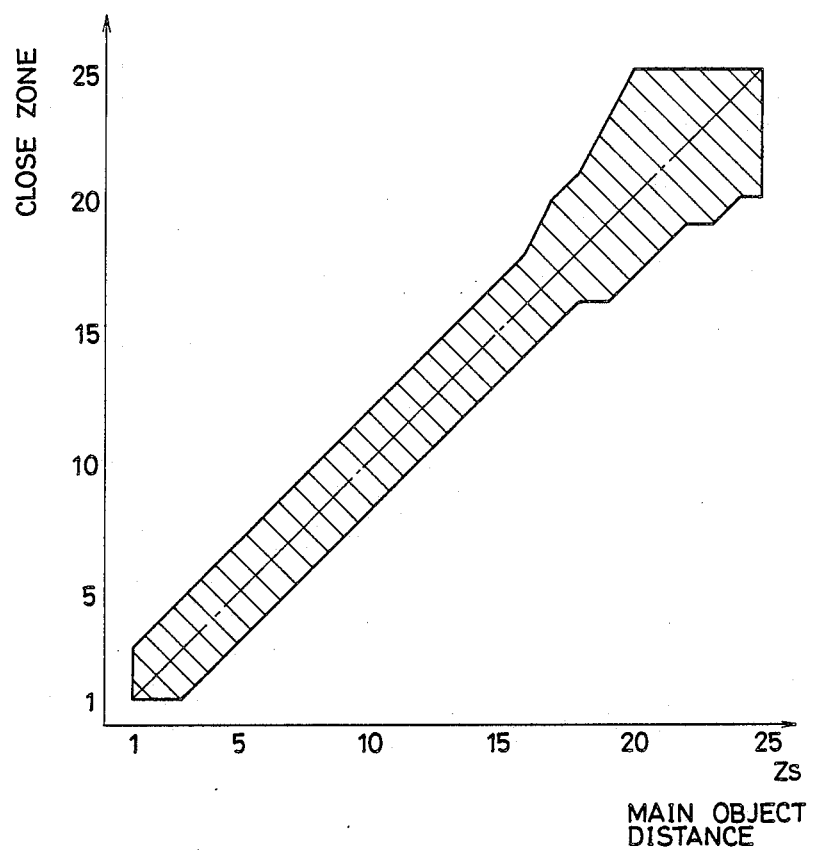
FIG. 9 is a graph showing the relationship between the main object distance and the close zone in the camera illustrated in FIG. 1.

The range of close zone in the camera according to this embodiment is shown in FIG. 9 as well as in Table 1. Referring to FIG. 9, the abscissa represents the zone number representing the main object distance, while the ordinate represents the zone number indicating the range of close zone. The shaded area and the borderline mark off the range of close zone for each lens stop position Zs. It will be apparent from Table 1 and FIG. 9 that the shorter the main object distance, the more expanded is the range of close zone.

In this embodiment, the range of close zone is discrete because it is expressed in zone number. In other words, it is varying discontinuously. Since the distance range represented by a single zone number is broad particularly on the far side, even a deviation of zone number 1 results in a large change in the range of close zone. Since the number of distance zones can be increased by using a high precision distance measuring means, an accurate distance measurement can then be insured even on the far side. Thus, since the distance range represented by a single zone number can then be narrowed, it becomes possible to continuously vary the range of close zone.

Selection of a Candidate Central Brightness Value AEc

While the camera according to this embodiment has three spot distance measuring areas L, C and R, it is not necessarily true that all of the spot brightness values Bvl, Bvc and Bvr correspond to the main object but rather some of the spot brightness data may correspond to the background. Therefore, in the camera according to this embodiment, distance data are used to check whether the respective spot brightness values Bvl, Bvc and Bvr correspond to the main object, thereby insuring that the central brightness value AEc may be accurately determined.

First, using the distance data $Z_1$ through $Z_5$ in the five distance measuring areas, it is checked whether or not these data are within the range of close zone. If the distance data are within the range of close zone, these data are considered to have been generated by measuring the main object distance. Therefore, the spot brightness value in the distance measuring area corresponding to the particular distance measuring area is regard as the brightness value corresponding to the main object.

Figure 10A:
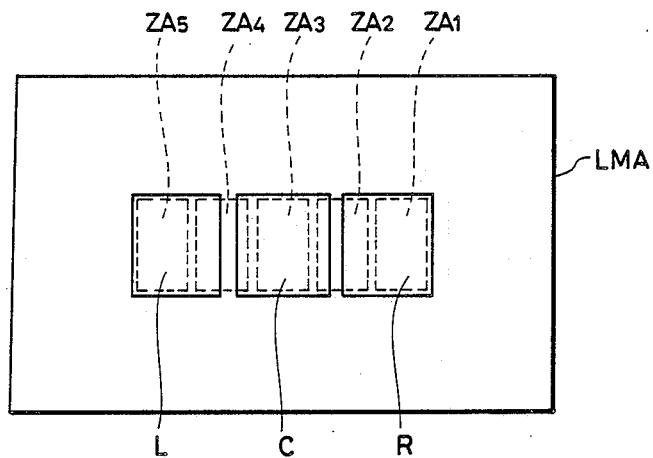
FIGS. 10A and 10B are diagrams showing the relationship between the brightness measuring range and the distance measuring range in the camera illustrated in FIG. 1.
Figure 10B:
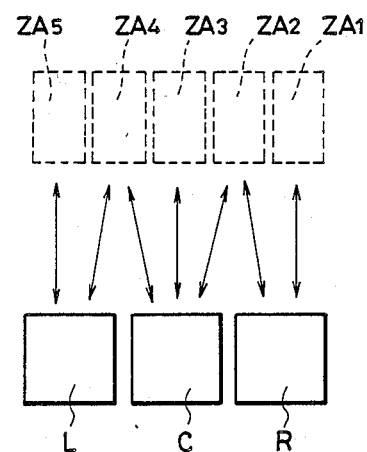

As shown in FIG. 10A, however, the distance measuring areas and spot distance measuring areas are not matching to each other on a one-to-one basis in the camera according to this embodiment. Therefore, these two sets of areas must be somehow matched. For example, one distance measuring area, which is closest and matched with each distance measuring area, may be selected or all or some distance measuring areas close to each distance measuring area may be selected. In this embodiment, the distance measuring areas and distance measuring areas are matched as illustrated in FIG. 10B. Thus, the distance measuring area $ZA_1$ is matched to the spot distance measuring area R, the distance measuring area $ZA_2$ to the spot distance measuring areas R and C, the distance measuring area $ZA_3$ to the spot distance measuring area C, the distance measuring area $ZA_4$ to the spot distance measuring areas C and L, and the distance measuring area $ZA_5$ to the spot distance measuring area L.

In connection with the selection of a distance measuring area, the specific actions of the microcomputer 1 are described below with reference to FIG. 11.

Figure 11:
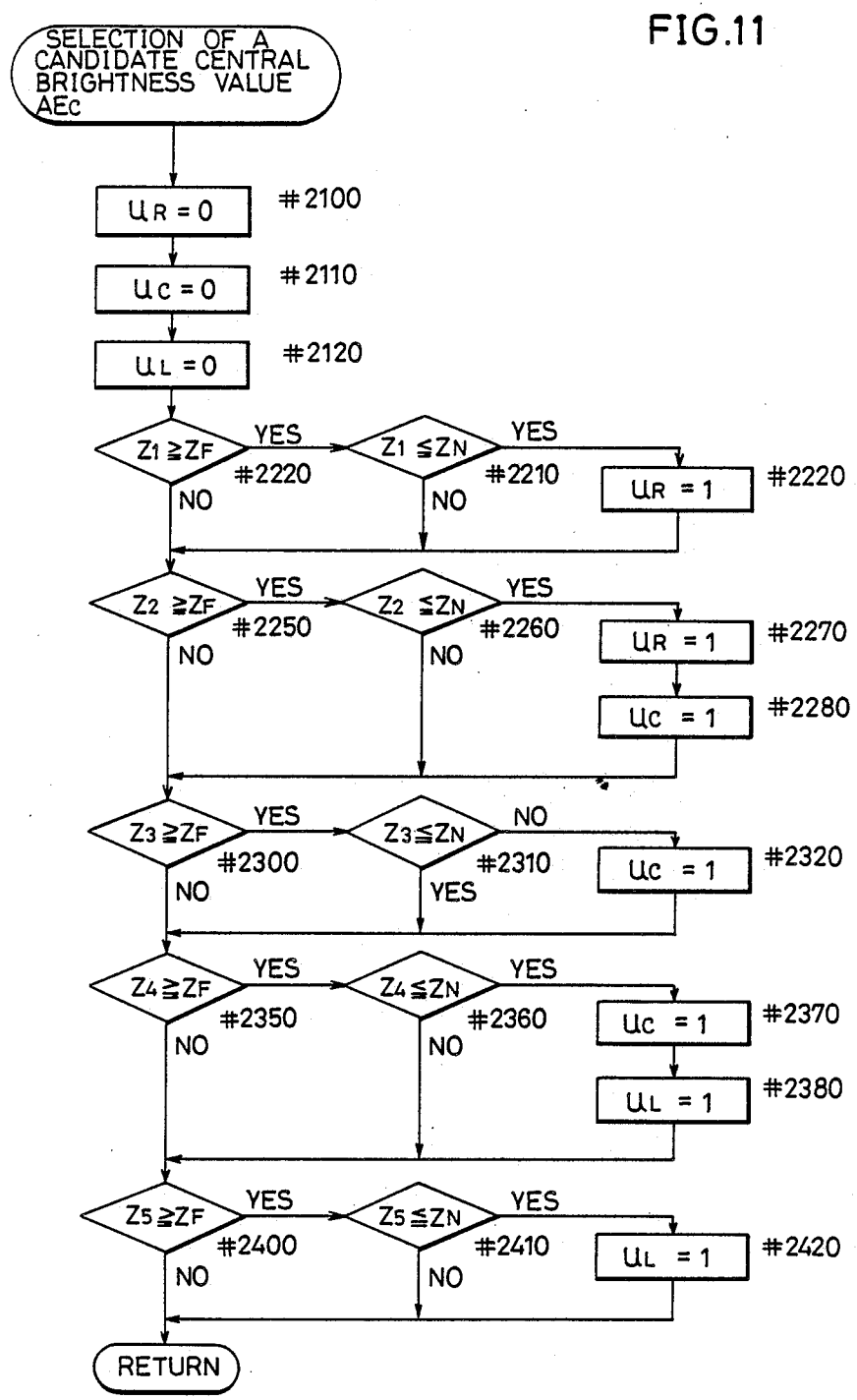
FIG. 11 is a flow chart showing the selection of a candidate measured brightness value in the central area in the camera illustrated in FIG. 1.

FIG. 11 is a flow chart showing the subroutine "selection of a candidate central brightness data AEc" in FIG. 6. Having advanced to this subroutine, the microcomputer 1 first resets the flags Ur, Uc and Ul (#2100 through #2120). These flags Ur, Uc and Ul are respectively set when the corresponding one of the brightness data Bvr, Bvc and Bvl from the distance measuring areas R, C and L is adopted for the determination of a central brightness value AEc.

The microcomputer further checks whether or not the distance data $Z_1$ in the extreme right distance measuring area $ZA_1$ is within the aforementioned range of close zone. First, the microcomputer 1 compares the distance data $Z_1$ with the far side limit $Zf$ of the range of close zone (#2200) and advances to step #2250 if $Z_1 < Zf$, that is to say the object in the distance measuring area $ZA_1$ is farther than the main object, while it advances to step #2210 if $Z_1 \geq Zf$. At step #2210, the microcomputer 1 compares the distance data $Z_1$ with the near side limit $Zs$ of the range of close zone (#2210) and advances to step #2250 if $Z_1 > Z_n$, that is to say the object in the distance measuring area $ZA_1$ is closer than the main object, while it advances to step #2220 if the object within the distance measuring area $ZA_1$ is the same as the main object. At step #2220, the microcomputer 1 sets the flag Ur for indicating that the brightness data Bvr from the distance measuring area R is adopted for the determination of the central brightness value AEc and, then, advances to step #2250.

Having advanced to step #2250, the microcomputer 1 enquires whether the distance data $Z_2$ is within the range of close zone (#2250, #2260) and if $Z_f \geq Z_2 \geq Z_n$, it sets the flags Ur and Uc (#2270, #2280) and advances to step #2300. Similarly, the microcomputer 1 sets and resets Uc and Ul.

It goes without saying that since the lens stop position $Z_s$ satisfies the relation of $Z_f \geq Z_s \geq Z_n$, at least one of the flags Ur, Uc and Ul is set.

Determination of Central Brightness Value AEc

Now, the method for determining the brightness value in the central distance measuring area, AEc, is explained below.

In the camera according to this embodiment, the average value AEcave of the brightness data Bvr, Bvc and Bvl in the three distance measuring areas R, C and L is taken as the central brightness value AEc in front light photography, while the central brightness value AEc is determined according to the position and size of the main object in rear light photography.

First, the method for determining the central brightness value AEc under rear light conditions is described below.

Figure 12:
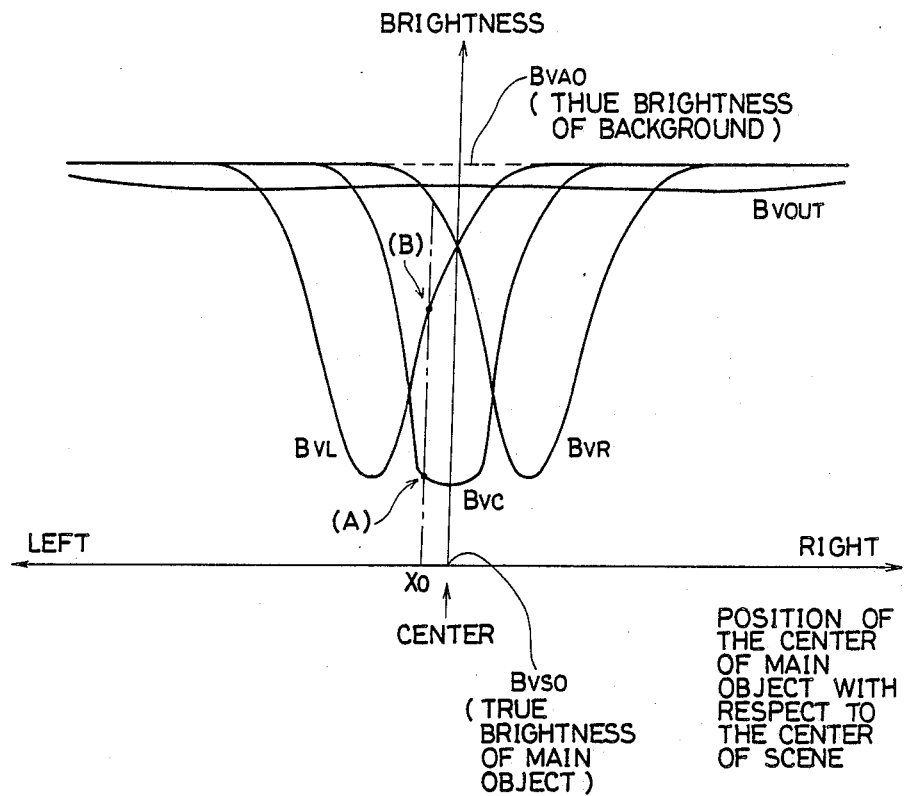
FIG. 12 is a diagram showing the errors of measured brightness values in respective brightness measuring areas under rear light conditions in the camera illustrated in FIG. 1.

FIG. 12 shows examples of rear light brightness data generated by the light measuring means 13 used in the camera according to this embodiment.

In FIG. 12, the abscissa represents the position of the main object with respect to the center of the scene, showing that the farther an alternate long and short dash line is displaced to the right or left in the figure, the farther is the main object situated to the right or left, respectively. The ordinate represents each spot brightness value relative to the true main object brightness value Bvso. Here, the farther the data upwardly displaced, the brighter is the data as compared with the true main object brightness value Bvso. The symbol Bvao stands for the true background brightness value.

It will be apparent from FIG. 12 that the error of brightness value of each light receiving means is minimal when the main object is situated in the center of the corresponding distance measuring area and increases as the position of the main object is displaced farther from the center of the distance measuring area. For example, when the central position of the main object lies at Xo on the left side of the center line of the field and Uc-=Ul=1, Ur=0, the spot measuring values corresponding to the main object are Bvc (point A) and Bvl (point B). As will be apparent from FIG. 12, the error (Bvl-Bvso) of brightness data Bvl in the spot photometry area L is larger than the error (Bvc-Bvso) of brightness data Bvc in the spot photometry area C.

Therefore, in rear light photography, even if there are more than one spot brightness values corresponding to the main object, it is not appropriate to regard the average of such values as the brightness of the main object. Rather, it is conducive to a reduced influence of the error and, therefore, more appropriate to regard the minimum value of the plurality of spot light measuring data as the brightness value of the main object.

However, there still remains some error even if the minimum value is taken and a correction must be made for the error. This error varies with at least the main object distance, the difference in brightness between background and main object, and different distance measuring areas. Therefore, the following error function E is contemplated for a further correction of the minimum value selected as above:

E=E (distance, brightness difference, distance measuring area).

Now, since the light measuring means 13 used in the camera according to this embodiment is an external light metering type, the angle of incidence of light is constant irrespective of the focal length of the photographing lens. In contrast, in the TTL type employing the light passing through the photographing lens, the angle of incidence is dependent on the focal length of the lens. Therefore, the error in the TTL type is not a function of distance but a function of image magnification and accordingly the error function E is expressed as:

E=E (image magnification, brightness difference, distance measuring area).

Thus, the error function varies somewhat in nature between the external light metering type as used in this embodiment and the TTL type. It is true, however, that the error function E is a function of the proportion of the main object in the photographic field or scene, the brightness difference between background and main object, and the distance measuring area.

Figure 13:
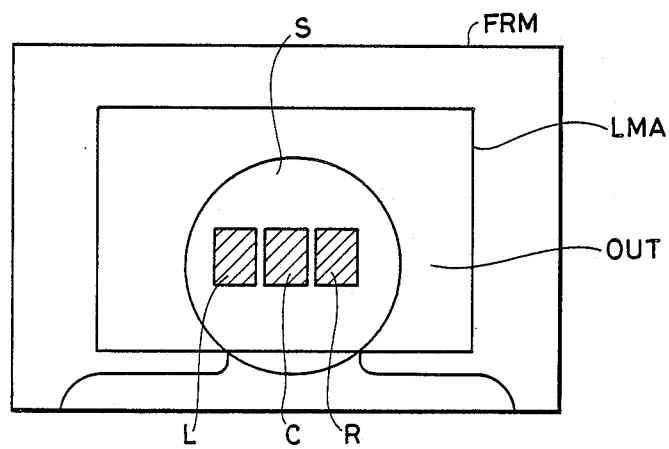
FIG. 13 is a diagram showing the relationship between the brightness measuring range and the main object in the case where the image magnification is extremely large in the camera illustrated in FIG. 1.

On the other hand, as shown in FIG. 13 by way of illustration, where the proportion of the main object with respect to the distance measuring areas R, C and L is fairly large, the aforementioned error is fairly small and little requires correction of brightness data. Therefore, in the camera according to this embodiment, it is checked whether the proportion of the main object in the distance measuring area is large or not and the brightness data is corrected according to the result of this inquiry.

Specifically, in the camera according to this embodiment, this inquiry of whether the proportion of the main object relative to the distance measuring area is large or not is performed in the following manner. First, it is inquired whether the majority (or all) of the spot distance measuring areas L, C and R correspond to the main object. As will be described hereinafter, this check is made by counting the flags set, among the flags Ul, Uc and Ur. Then, the scattering of the spot brightness data Bvl, Bvc and Bvr is investigated and if the variation is small, it is judged that the proportion of the main object with respect to the distance measuring area is fairly large. This judgement of data variation is performed by comparing at least two of the maximum value, minimum value and average value of brightness data.

Then, the method of determining the central brightness value AEc in front light photography is described below. Under front light conditions, unlike in rear light photography, the spot metering data are not much affected by background brightness etc. but there is involved an error due to the reflectance of the object. This means that it is not appropriate to use only one of spot brightness values. In the camera according to this embodiment, therefore, the average value AEcave of all the spot metering data Bvr, Bvc and Bvl is taken as the central brightness value AEc.

It should be understood that the central brightness value AEc in front light photography is not limited to the average value of all spot metering data but may be a value representative of a plurality of spot metering data. For example, the average of the maximum and minimum spot metering data values (that is the median brightness value) may be regarded as the central brightness value AEc. Alternatively, the average of brightness data exclusive of the maximum and minimum values may be regarded as the central brightness value AEc. In this case, the influence of the scattering of spot metering data can be alleviated. Furthermore, a value such that the most numerous data will fall within a certain range (for example, $-0.2$ Ev to $+0.3$ Ev) inclusive of that value is determined of a plurality of spot metering values and this value is regarded as the central brightness value AEc.

Figure 14:
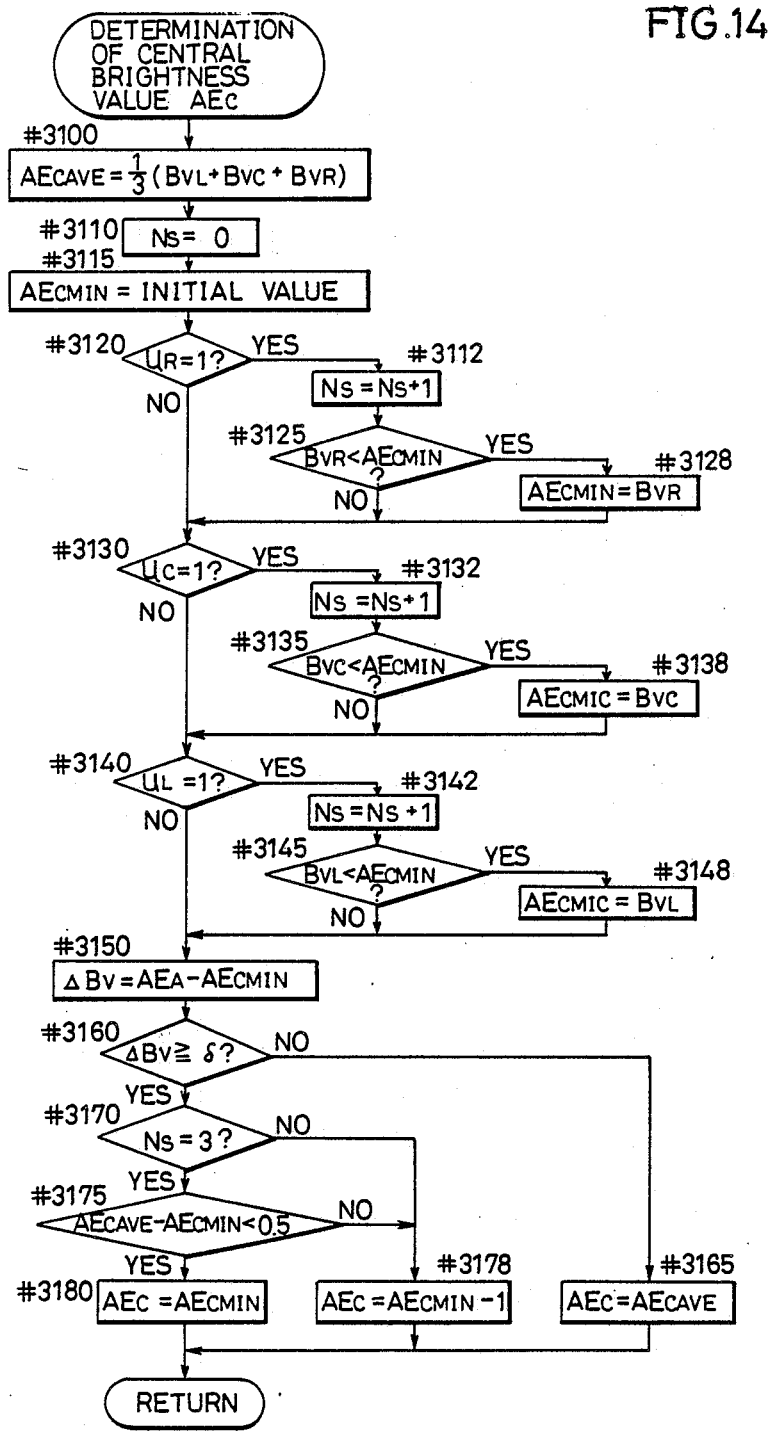
FIG. 14 is a flow chart showing the method of determining the measured brightness value in the central area in the camera illustrated in FIG. 1.

A specific method of determining the central brightness value AEc in the camera according to this embodiment is described below with reference to the flow chart given in FIG. 14.

First of all, the microcomputer 1 at step #3100 determines the average value of spot metering data, $AEcave = (Bvl + Bvc + Bvr)/3$, for front light photography.

As mentioned hereinbefore, these three spot metering data have already been checked, using distance data, to see whether they correspond to the main object (FIG. 12) and the result of this inquiry can be ascertained from the statuses of flags Ur, Uc and Ul. Therefore, it might be contemplated to determine the average value of spot metering data using only the spot metering data corresponding to the distance measuring area for which the flag is 1 (has been set). However, in this case, the number of such data may happen to be only one and the influence of the reflectance of the object will then be remarkable. This is not an appropriate candidate for the central brightness value under front light conditions. Therefore, in the camera according to this embodiment, the average value AEcave is always determined, at step #3100, using all spot metering data, irrespective of the features of flags Ur, Uc and Ul.

In this connection, it may be so arranged that the number of spot metering data corresponding to the main object is counted and, if the number is less than a predetermined value (for example, 2) (i.e. the counted number is 1), average value of all the spot metering data is regarded as the front light central brightness value. On the other hand, if the number is not smaller than said predetermined value (for example, 2 or more), the average value (or a representative value other than the average) of the spot metering data corresponding to the main object is regarded as the central brightness value for front light photography. By so doing, it is possible to reduce the influence of reflectance of object and bring the front light central brightness value closer to the true brightness of the main object.

After calculating the average of spot metering value AEcave, the microcomputer 1 counts the number Ns of the spot metering data corresponding to the main object, among the three spot metering data Bvr, Bvc and Bvl, and for use in rear light photography, determines the minimum value AEcmin from among them.

First, the microcomputer 1 at step #3110 substitutes 0 into Ns. At step #3115, it substitutes an appropriate initial value into AEcmin. As this initial value, a predetermined value (for example, a large value which will not actually occur) or the average value AEcave may be used. Of course, this minimum value AEcmin is surely replaced, at a later step, with one of the spot metering data Bvl, Bvc and Bvr.

Then, the microcomputer 1 at step #3120 checks if the flag Ur is 1 or not and advances to step #3122 if the flag Ur is 1 or to step #3130 if the flag Ur is not 1. At step #3122, the microcomputer 1 adds 1 to the counter value Ns. Then, the microcomputer 1 advances to step #3125, where it compares the spot metering value Bvr in the distance measuring area R at the current time with said minimum value AEcmin. If Bvr<AEcmin, the microcomputer 1 advances to step #3128, where it replaces the minimum value AEcmin with the spot metering data Bvr and further advances to step #3130. If Bvr≧AEcmin at step #3125, the sequence skips to step #3130.

Then, the counter Ns and the minimum value AEcmin are set in the same manner as above (#3130 through #3148)

Now, for checking whether the photographing condition is rear light or front light, the microcomputer 1 at step #3150 determines the value ΔBv which is obtainable by subtracting AEcmin from the peripheral brightness value AEa. At step #3160, the microcomputer 1 compares the difference ΔBv with the rear light detection level δ and if the difference ΔBv is not less than the rear light detection level δ(ΔBv≧δ), the microcomputer 1 judges that the photographing condition is rear light and advances to step #3170. If the difference δBv is less than the rear light detection level δ(ΔBv<δ), the microcomputer judges that the photographing condition is front light and advances to step #3165.

Then, in rear light photography, the microcomputer 1 assesses the proportion of the main object relative to the spot distance measuring area. First, at step #3170, the microcomputer 1 checks if the count value Ns is equal to 3 and if the count value Ns is 3, that is to say all the three spot metering data correspond to the main object, the microcomputer 1 advances to step #3175 If not, the microcomputer 1 advances to step #3178 At step #3175, for assessing the scattering of spot metering data, the microcomputer 1 calculates the difference (AEcave−AEcmin) between the average value of spot metering data AEcave and the minimum value AEcmin, and if the difference is smaller than 0.5, it advances to step #3180. If not, the microcomputer 1 advances to step #3178.

Thus, in the camera according to this embodiment, the sequence proceeds to step #3165 under front light conditions, while in rear light photography the sequence proceeds to step #3178 if the light metering value is to be corrected or to step #3180 if no correction is required.

If correction of the brightness value is not required in rear light photography, the microcomputer 1 at step #3180 sets the central brightness value AEc to the minimum value AEcmin and returns to the original flow chart (FIG. 6). If a correction of the minimum value AEcmin is required in rear light photography, the microcomputer 1 at step #3178 sets the central brightness value AEc at a value (AEcmin−1) obtainable by subtracting 1 (Ev) from the minimum value AEcmin. Thus, in the camera according to this embodiment, for simplicity of operation, the error function E is always set to assume a constant value of 1 irrespective of photographing distance, brightness difference and distance measuring area. Of course, as mentioned hereinbefore, the amount of correction E may be varied according to photographing distance, brightness difference and distance measuring area. After the central brightness value AEc has thus been set, the microcomputer returns to the original flow chart (FIG. 6).

It should be understood that the amount of correction E may not only be made dependent on photographing distance, brightness difference and distance measuring area but may be more elaborately determined according to a plurality of spot metering values (3 values in the camera of this embodiment). In this case, the judgement of necessity for correction is not required and, therefore, the steps #3170 and #3175 may be omitted.

Under front light conditions, the microcomputer 1 at step #3165 sets the central brightness value AEc to the average value AEcave and returns to the original flow chart (FIG. 6).

Even if it is judged at step #3170 and #3175 that no correction is required, strictly speaking some correction is still necessary. Therefore, a minor correction, smaller than the correction to be made when a correction is found to be necessary, may be performed at step #3180. For example, a correction (0.25 Ev) smaller than that at step #3178 (amount of correction :1 Ev) may be performed at step #3180, as follows:

$$AEc = AEcmin - 0.25.$$

Determination of Main Object Brightness Value Bvs

The method of determining the main object brightness value Bvs in the camera of this embodiment is described below. Since the operation varies between in front light and rear light states, the respective operations will be explained separately.
(i) Front light photography Fundamentally speaking, the weighted average of the peripheral brightness value AEa and central brightness value AEc is adapted as the main object brightness value Bvs. Thus, the main object brightness value Bvs is given by the following equation.

$$Bvs = (1-w)AEa + w \cdot Ec \text{ (w is a constant)}$$

As mentioned previously, AEc=AEcave in front light photography.

Since the sizes of peripheral distance measuring area OUT and spot photometry areas L, C and R relative to the photographing range FRM vary according to the focal length of the photographing lens as mentioned hereinbefore (FIGS. 7A through 7F), it is not appropriate to adopt a common constant w. When the photographing lens is set for standard photography (short focal length side), the size of even the peripheral distance measuring area OUT is fairly small as compared with the photographing range FRM, i.e. about ⅓ of the range FRM in transverse direction. The sizes of spot photometry areas L, C and R are, for that matter, very small with respect to the photographing range FRM. Therefore, in standard photography, the constant w must be a value giving a weight to the peripheral brightness value AEa. Conversely in teleconverter photography, the size of the peripheral distance measuring area OUT is substantially the same as that of the photographing range FRM and the spot photometry areas L, C and R also assume the sizes equal to about ⅓ of the photographing range in transverse direction. In this case, therefore, the central brightness value AEc should also be weighted to a certain extent.

Thus, by varying the weights to the peripheral brightness value AEa and central brightness value AEc, an effect comparable to the effect obtainable by changing the angle of incidence can be accomplished even in the external light metering type such as the one according to this embodiment.

It should be understood that this concept is applicable not only to dual-focal-length cameras, such as this embodiment, but also to cameras with zoom lens.

Now, exposure control at high brightness (not less than 10 Bv) is discussed with reference to FIGS. 15A through 15E.

FIGS. 15A through 15E each is a diagrammatic representation of the relationship between the brightness value and the exposure correction amount. The abscissa represents the brightness value and the ordinate the exposure correction value.

The brightness of an object with a standard reflectance as measured using a reflection type exposure meter is generally less than Bv 10 even under a cloudless sky and may reach, though rarely, the level of Bv 10. On the other hand, a white object with a high reflectance has a brightness value within the range of about Bv 10 to Bv 12. Moreover, when influenced by a snow-clad landscape on a fine day or a light source such as the sun, the brightness of the object may at times register a value over Bv 12.

Figure 15A:
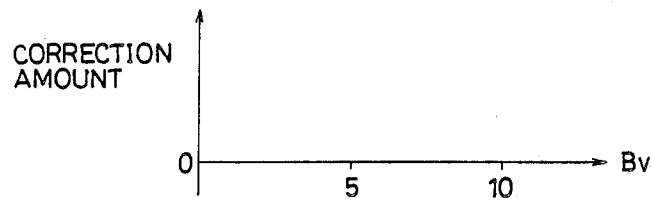
FIGS. 15A and 15B each is a graph showing the relation between the brightness of an object and the amount of correction thereof in the conventional camera.
Figure 15B:
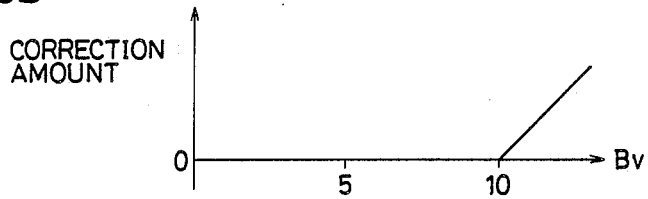

For exposure control, there is known a method by which exposure is controlled to an appropriate level irrespective of brightness as shown in FIG. 15A as well as the method by which exposure control is carried out assuming that any brightness in excess of a predetermined brightness value is equal to the predetermined brightness value as shown in FIG. 15B.

However, in the former exposure control, photographing an object of high brightness does not yield a picture suggestive of the high brightness, giving an unnatural impression. In order to have a sense of high brightness to be reproduced in a picture, an intentional exposure adjustment by the photographer has heretofore been required. Moreover, the influence of a light source, such as the sun, is liable to be felt and an extreme underexposure is also frequently experienced.

On the other hand, in the latter method of exposure control, the influence of a light source is not so great as in the former method but the following problems cannot be obviated.

As mentioned hereinbefore, the brightness of an object with the standard reflectance value may reach Bv 10, though rarely, and in order to achieve the proper exposure of such an object with the standard reflectance value, said predetermined brightness value must be set at a level not less than Bv 10. As mentioned hereinbefore, the brightness of a white object is usually within the range of Bv 10 through Bv 12 and, therefore, if said predetermined value is set at Bv 10, the amount of exposure correction for the white object will be equal to 0 to +2 Ev. For example, for a white object with a brightness value of Bv 11, the correction for the object is equivalent to an overexposure of +1 Ev.

On the other hand, the proper amount of exposure correction for a white object is generally acknowledged to be about +2 Ev. Therefore, the amount of correction will be inadequate for the above white object with a brightness value of Bv 11. Increasing the amount of correction in this situation would call for lowering of the predetermined value but if the predetermined value is decreased too much, there develops an undesirable situation that an object with the standard reflectance will also be subjected to exposure correction.

Figure 15C:
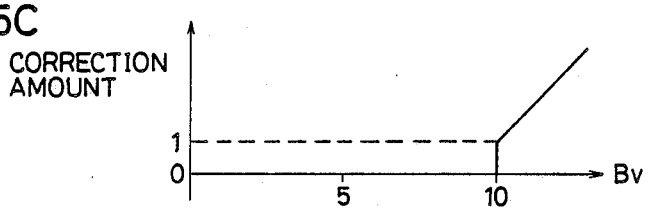
FIGS. 15C through 15E each shows the relation between the brightness of an object and the amount of correction thereof in the embodiment of this invention.
Figure 15D:
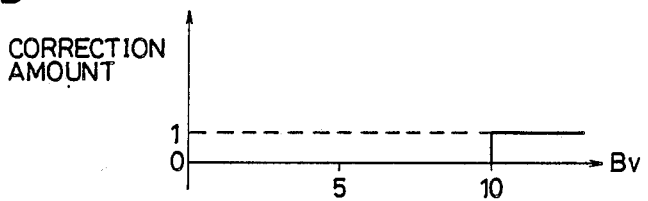

Therefore, in the camera according to this embodiment, a first predetermined brightness value and a second predetermined brightness value, which is lower than the first one, are used for high brightness (not less than 10 Bv) and when the light metering value exceeds the first predetermined brightness value, exposure control is carried out using the second predetermined brightness value (FIG. 15C). By this arrangement, a larger amount of exposure correction than ever before can be applied to an object of high brightness without alteration of the range conducive to the proper exposure so as to allow an object with the standard reflectance to be properly exposed and, at the same time, have a sense of high brightness reproduced in the resultant picture.

Figure 15E:
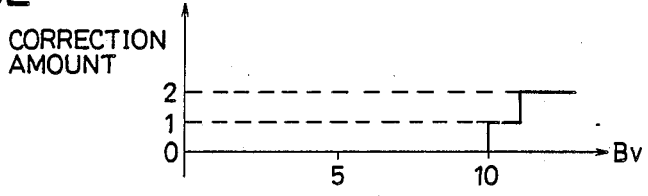

Aside from the above procedure, a similar effect may be achieved by making an exposure correction by a first predetermined amount (for example, 1 Ev) to the plus (overexposure) side when the light metering value exceeds the first predetermined brightness value (for example, Bv 10) (FIG. 15D), or making an exposure correction by a second predetermined amount, which is larger than the first one, to the plus side when the light metering value exceeds the second brightness value (for example, Bv 11), which is larger than the first predetermined brightness value (for example, Bv 10) (FIG. 15E). It is also possible to estimate the status of the object according to object distance and accordingly vary the amount of correction or making the amount of correction nil.

The foregoing is the method of determining the main object brightness value Bvs is front light photography.

(ii) Rear light photography

To avoid the influence of the background, the central brightness data AEc is used as the main object brightness value Bvs. Thus, Bvs=AEc.

Figure 16:
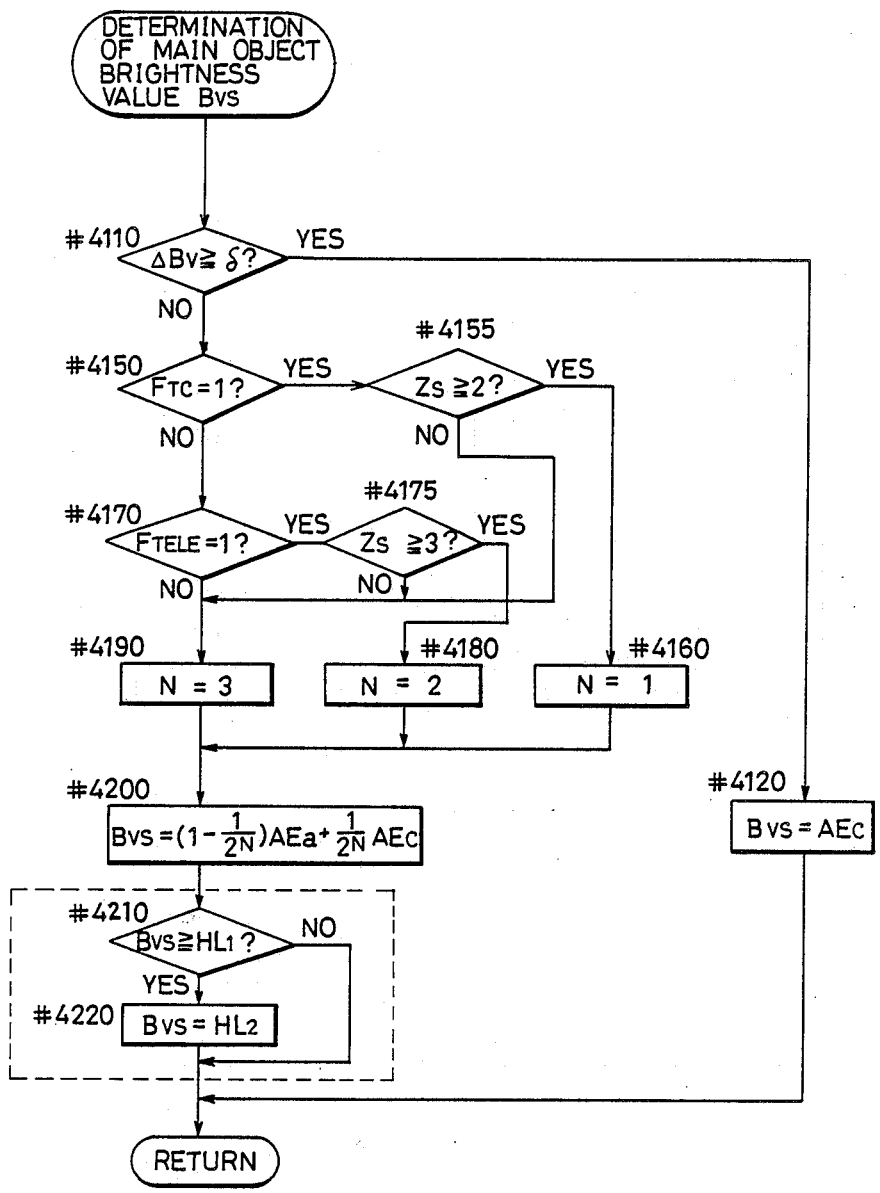
FIG. 16 is a flow chart showing the method of determining the brightness of the main object in the camera illustrated in the embodiment of this invention.

Now, a specific example of the method for determining the main object brightness value Bvs in the camera of this embodiment is described with reference to the flow chart presented in FIG. 16.

First of all, the microcomputer 1 at step #4110 compares the brightness difference ΔBv (cf. FIG. 14, step #3150) with the rear light detection level δ and advances to step #4120 if Bv≧δ, that means rear light, or to step #4150 if Bv<δ, that means front light.

Under front iight conditions, the microcomputer 1 determines weights to AEa and AEc at steps #4150 through #4190.

In the camera according to this embodiment, in accordance with the type of photography (focal length of the photographing lens) and the lens stop position Zs corresponding to main object distance, the weights are set, as the ratio of peripheral brightness value AEa to central brightness value AEc, as follows:

$$1 - \frac{1}{2^N} : \frac{1}{2^N} \quad (N = 1, 2, 3).$$

At step #4150, the microcomputer 1 checks whether a teleconverter has been mounted and advances to step #4155 it the teleconverter is mounted (the flag Ftc has been set) or to step #4170 if it is not (the flag Ftc has not been set). At step #4155, the microcomputer 1 checks whether $Zs \geq 2$ and advances to step #4160 if $Zs \geq 2$, i.e. $Zs \neq 1$, or to step #4190 if $Z_2 21\ 2$, i.e. $Zs=1$.

As will be described hereinafter, the weight to the peripheral brightness value AEa is increased at step #4190. This is done because it is more appropriate to consider that the main object is located at a far distance and constitutes a part of the background.

At step #4160, the microcomputer 1 sets the weight ratio of peripheral brightness value AEa to central brightness value AEc at 1:1. Thus, in consideration of the relationship between the photographing range FRM and the brightness measuring range LMA in teleconverter photography (FIG. 7C), a large weight is given to the central brightness value AEc as well. After setting N, the microcomputer 1 advances to step #4200.

At step #4170, the microcomputer 1 checks whether the focal length of the lens is a longer one or not and advances to step #4175 if it is on the long focal length side (the flag Ftele has been set) or to step #4190 if it is on the short focal length side (the flag Ftele has not been set). At step #4175, the microcomputer 1 checks whether $Zs \geq 3$ and advances to step #4180 if $Zs \geq 3$ or to step #4190 if $Zs<3$, i.e. $Zs=1$ or $Zs=2$. This is because, as aforesaid, it is more appropriate to consider that the main object is located at a far distance and constitutes a part of the background.

At step #4180, the microcomputer 1 sets N=2 and adjusts the weight ratio of peripheral brightness value AEa to central brightness value AEc to 3:1. Since, as apparent from FIG. 7 B and 7C, the proportion of the brightness measuring range LMA in the photographic range FRM is smaller in telephotography than in teleconverter photography, the weight to the peripheral brightness value AEa is made a little larger than it is for photography with a teleconverter. After setting of N, the microcomputer 1 advances to step #4200.

At step #4190, the microcomputer 1 sets N=3 and adjusts the weight ratio of peripheral brightness value AEa to central brightness value AEc is set to 7:1.

As mentioned above, the microcomputer 1 advances to step #4190 in standard photography or when the main object is located at such a far distance that it is better regarded as constituting a part of the background. In standard photography, as will be apparent from FIG. 7A, the brightness measuring range LMA is extremely small in comparison with the photographing range FRM and the main object occupies a large proportion of the brightness measuring range LMA. Therefore, in the camera of this embodiment, the weight to the peripheral brightness value AEa is increased under the above conditions.

Having advanced to step #4200, the microcomputer 1 calculates the main object brightness value Bvs using the weights to peripheral and central brightness values AEa and AEc, which have been determined at the preceding steps (#4160, #4180, #4190). In the camera of this embodiment, AEc=AEcave for front light photography so that the influence of variation in the reflectance value of the main object can be reduced.

After determination of the main object brightness value Bvs, the microcomputer 1 at step #4210 compares the main object brightness value Bvs with the first predetermined brightness value $HL_1$ (for example, Bv 10) for an object of high brightness and advances to step #4220 if $Bvs \geq HL_1$ or returns to the flow chart shown in FIG. 6 if $Bvs < HL_1$. At step #4220, the microcomputer 1 replaces the main object brightness value Bvs with the second predetermined brightness value $HL_2$ (for example, Bv 9) which is smaller than the first predetermined brightness value $HL_1$ and returns to the flow chart presented in FIG. 6. Thus, in this case, the correction illustrated in FIG. 15C is carried out.

On the other hand, in the rear light photography, the microcomputer 1 at step #4120 substitutes the central brightness value AEc for the main object brightness value Bvs. As mentioned hereinbefore (FIG. 14), the central brightness value AEc in this case is either AEmin or (AEmin−1). Then, the microcomputer 1 returns to the flow chart shown in FIG. 6.

Figure 17:
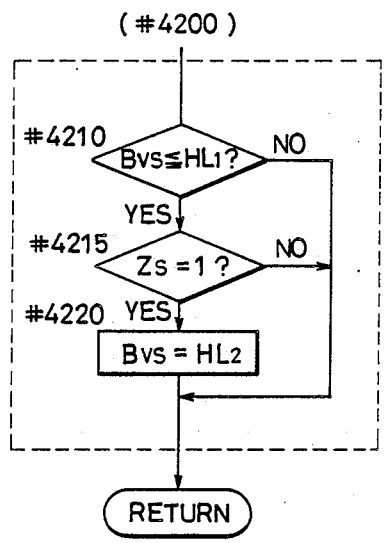
FIG. 17 is a flow chart showing the method of determining the brightness of the main object in another embodiment of this invention.

A modification in which exposure control at high brightness in front light photography is limited to long photographing distances is shown in FIG. 17. This modification corresponds to the addition of step #4215 to the part enclosed by dotted lines in FIG. 16. Since the other steps are identical with those shown in FIG. 16, these are not represented.

At step #4215, the microcomputer 1 checks whether the lens stop position Zs is Zs=1 or not and advances to step #4220 if Zs=1 or returns directly to the flow chart of FIG. 6 if Zs=1, i.e. $Zs \geq 2$. Thus, in this modification, the correction of main object brightness value Bvs is performed only under the conditions of front light, high brightness and long photographing distance.

This limitation to long photographing distance is made for performing high brightness control only for a snow-clad landscape or the like.

Determination of Shutter Controlling Value Ev-Control and Judgement of Flashlight Use Now, a specific example of step #1400 in the flow chart of FIG. 6 is described below with reference to FIG. 18.

First of all, the microcomputer 1 checks whether the emission prohibition switch not shown is turned ON (#5100). If it is judged from the information stored in step #32, illustrated in FIG. 2B, indicating that the emission prohibition switch is turned ON, the microcomputer 1 advances to step #5110. If it is not, the microcomputer advances to step #5120. At step #5110, the microcomputer 1 performs the operation $Ev\text{-}control = Bvs + Sv$ and, then, advances to step #5300.

At step #5120, the microcomputer 1 judges whether the photographing condition is rear light or front light.

When a distant scene is photographed using a camera adapted to detect rear light and perform an automatic flashlight emission under rear light, the flashlight substantially does not reach the object and serves no purpose at all. Therefore, in the camera according to this embodiment, the microcomputer 1, upon finding of rear light ($Bv \geq \delta$) at step #5120, checks whether the main object is distant or not (#5130) so that only when the main object is located at a comparatively short distance (when $Zs \geq 2$ in this embodiment), the camera effects a flashlight emission automatically in rear light photography (#5150).

After the flag Ffl indicating a flashlight emission is set (rear light automatic emission) at step #5150, the microcomputer 1 compares the peripheral brightness value AEa with the first predetermined brightness value $HL_1$ (for example, Bv 10) of high brightness and advances to step #5170 if $AEa < HL_1$ or to step #5180 if $AEa \geq HL_1$.

At step #5170, the microcomputer 1 substitutes the value of $\{(AEa-1)+Sv\}$ for the shutter controlling value Ev-control for achieving an overexposure of 1 EV for the background and thereby reproducing a sense of rear light and, then, advances to step #5250. It should be understood that the above amount of overexposure for the background need not necessarily be 1 Ev but may be a different value.

In advancing to step #5180, that is to say when the peripheral brightness value AEa is not less than the predetermined brightness value $HL_1$, it is assumed that the background may be of fairly high brightness or there may be a light source in the background, for instance. Therefore, in the camera according to this embodiment, the microcomputer 1 substitutes the sum of the second predetermined brightness value $HL_2$, which is smaller than the first predetermined brightness value $HL_1$, and the film sensitivity value Sv for the shutter controlling value Ev-control and, then, advances to step #5250. Thus, $Ev\text{-}control = HL_2 + Sv$. By this arrangement, a sense of high background brightness under rear light conditions can be faithfully reproduced and, at the same time, the influence of the light source in the background can be attenuated.

It should be understood that at step #5180 the amount of overexposure for the background may be increased over the amount of overexposure (1 EV) used at step #5170. For example, $\{(AEa-2)+Sv\}$ may be substituted for Ev-control so as to give an overexposure of 2 Ev for the background.

When the judgement at step #5120 is front light ($\Delta Bv < \delta$) or the judgement at step #5130 is that the main object is far (Zs=1), the microcomputer 1 advances to step #5140 and checks whether forced emission is demanded.

The microcomputer advances to step #5140 only when no flashlight emission is to take place in view of the result of rear light detection but in the camera according to this embodiment, it is so arranged that when the photographer wishes to perform flash photography and has turned the forced emission switch (not shown) ON, flash photography takes place, respecting the photographer's intention. Therefore, upon sensing the ON condition of the forced emission switch at step #5140 from the information stored at step #32 in FIG. 2, the e microcomputer 1 sets the flash emission flag Ffl (#5190) and advances to step #5200. If the forced emission switch is found to be OFF by an enquiry made at step #5140, the microcomputer 1 skips to step #5200.

At step #5200, just as at step #5110, the microcomputer 1 performs the operation:

$Ev\text{-}control = Bvs + Sv$ and, then, advances to step #5250.

At step #5250, the microcomputer 1 compares the shutter controlling value Ev-control with the exposure value Evh corresponding to the camera shake limit value (switching point of flash emission due to low brightness) and advances to step #5260 if Ev-control-≦Evh or skips to step #5300 if Ev-control>Evh.

At step #5260, the microcomputer 1 sets the flag Ffl for flashlight emission (low brightness automatic emission) and, then, advances to step #5300.

The microcomputer then checks whether the calculated shutter controlling value Ev-control is within the shutter controllable range (#5300 through #5330). First, the microcomputer 1 compares the calculated shutter controlling value Ev-control with the maximum shutter controlling value Evmax (#5300) and if Ev-control>Evmax, re-sets the shutter controlling value Ev-control to the maximum value Evmax (#5310). Then, the microcomputer 1 compares the shutter controlling value Ev-control with the minimum shutter controlling value Evmin (#5320) and, if Ev-control<Evmin, re-sets the shutter controlling value Ev-control to the minimum value Evmin (#5300).

After the shutter controlling value Ev-control and the flag Ffl have thus been set, the sequence returns to the flow chart given in FIG. 6.

Figure 19:
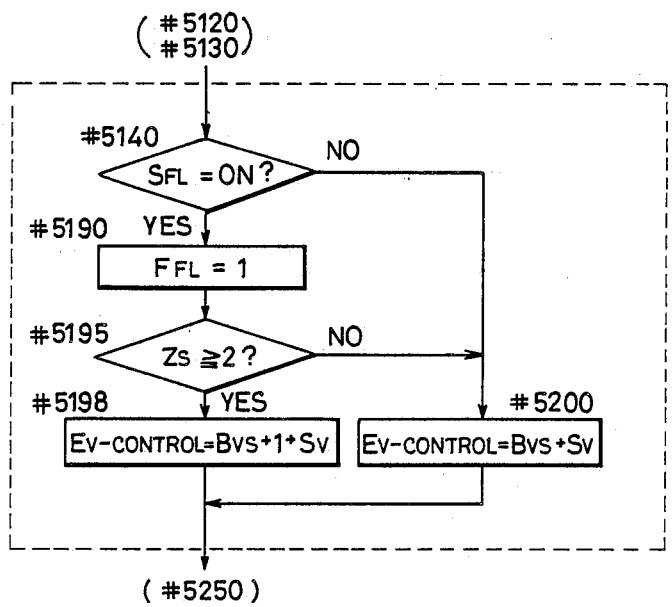
FIG. 19 is a flow chart showing the method of determining the shutter controlling value and the use-of-flashlight judgement in the camera according to another embodiment of this invention.

According to this flow chart, a forced emission may cause the main object to be overexposed. To avoid this result, the steps #5140 through #5200 may be modified as shown in FIG. 19 and the main object be exposed as appropriately as possible as will be described below.

First, the microcomputer 1 makes an enquiry about forced emission at step #5140 and, if the answer is no forced emission, performs the operation of $Ev\text{-}control = Bvs + Sv$ just as mentioned hereinbefore. If the answer is a forced emission, the microcomputer 1 sets the flag Ffl (#5190) and, then, judges whether the main object is far (#5195). If the judgement is that the main object is far (Zs=1), the microcomputer 1 advances to step #5200 to set the shutter controlling value Ev-control. On the other hand, if the main object is more or less near (Zs=2), the microcomputer 1 performs the operation:

$$Ev\text{-}control = Bvs + 1 + Sv$$

to obtain the shutter controlling value Ev-control.

Thus, in the case of forced emission, if the main object is more or less near, the main object is underexposed by 1 Ev with ambient light, therefore, the main object can be properly exposed by compensating this shortage of light with flashlight. In this case, however, the background is underexposed by 1 Ev. Moreover, it is so designed that when the main object exists at a far distance, the main object can be properly exposed by ambient light only but a flashlight emission does not cause an overexposure of the main object because the flashlight cannot reach the main object.

Determination of Flashlight Correction Amount ΔEvfl

In the conventional flash photographic system, the ambient light component is disregarded and the proper exposure is sought by flashlight alone. Therefore, in the situation where the ambient light component cannot be disregarded, particularly in daylight synchro-flash photography, the object is overexposed. Moreover, there has been proposed a system in which the timing of flashlight emission is changed in daylight synchro-flash photography to insure that the exposure by flashlight will be decreased by a predetermined amount from the proper exposure value.

However, there are cases in which the proper exposure is not obtained, according to the status of the object, by the mere underexposure of such a predetermined amount. There also are cases, even in flash photography at low brightness, the ambient light component cannot be disregarded.

Therefore, in the camera according to this embodiment, flashlight emission control is carried out in such a manner that irrespective of low brightness or rear light, the ambient light component of the main object is always taken into account in flash photography and the shortage of ambient light quantity compensated for by flashlight. By so doing, the main object is always exposed properly.

When exposure with ambient light alone is performed, the difference ΔBvs between the main object exposure value and the proper exposure value is expressed as follows:

$$\Delta Bvs = Bvs - (Ev\text{-}control - Sv)$$

where Ev-control represents the shutter controlling value, Bvs the main object brightness value and Sv the sensitivity of the film used. For example, when the film sensitivity is ISO 100 (Sv=5), Bvs=2.5 and Ev-control=8.5, ΔBvs=−1. Thus, the use of ambient light alone results in an underexposure of the main object by 1 Ev.

Now, assuming that the quantity of light necessary for the proper exposure of the main object is 1, the quantity of light provided by ambient light (that is to say the proportion of ambient light relative to the proper quantity of light) is $2^{\Delta Bvs}$. For example, when the main object is properly exposed by ambient light alone (i.e. ΔBvs=0), the quantity of ambient light is 1. When exposure of the main object with ambient light alone results in an underexposure of 1 Ev (i.e. ΔBvs=−1), the quantity of ambient light is ½. Furthermore, when exposure of the main object with ambient light alone results in an underexposure of 2 Ev (i.e. ΔBvs=−2), the quantity of ambient light is ¼. And when there is no ambient light, ΔBvs=−∞. Therefore, the shortage of light which occurs in exposure with ambient light alone, that is to say the quantity of light which must be supplementally supplied by flashlight emission is $(1-2^{\Delta Bvs})$. Thus, the proper exposure of the main object cannot be obtained unless the quantity of flashlight is decreased as compared with the case in which the proper exposure of the main object is obtained with flashlight alone (the case in which the quantity of flashlight is 1). This flashlight correction amount, in the APEX value of ΔEvfl, is:

$$\Delta Evfl = \log_2(1 - 2^{\Delta Bvs}).$$

For example, when there is no ambient light at all (ΔBvs=−∞), ΔEvfl=0. In other words, the main object cannot be properly exposed unless a flashlight emission is made so as to give the proper exposure of the main object with flashlight alone. When the use of ambient light alone results in an underexposure of the main object by 1 Ev (ΔBvs=−1), ΔEvfl=−1. Thus, a flashlight emission equivalent to an underexposure of 1 Ev with flashlight alone results in the proper exposure of the main object by ambient light plus flashlight. Furthermore, when the use of ambient light alone gives an underexposure of 2 Ev (ΔBvs=−2), ΔEvfl=−0.42. Thus, a flashlight emission equivalent to an underexposure of the main object by about 0.42 Ev with flashlight alone results in the proper exposure of the main object by ambient light plus flashlight. And when the main object is properly exposed with ambient light along ($\Delta Bvs=0$), $\Delta Evfl = -\infty$. Thus, no flashlight is required for the proper exposure of the main object.

Figure 20A:
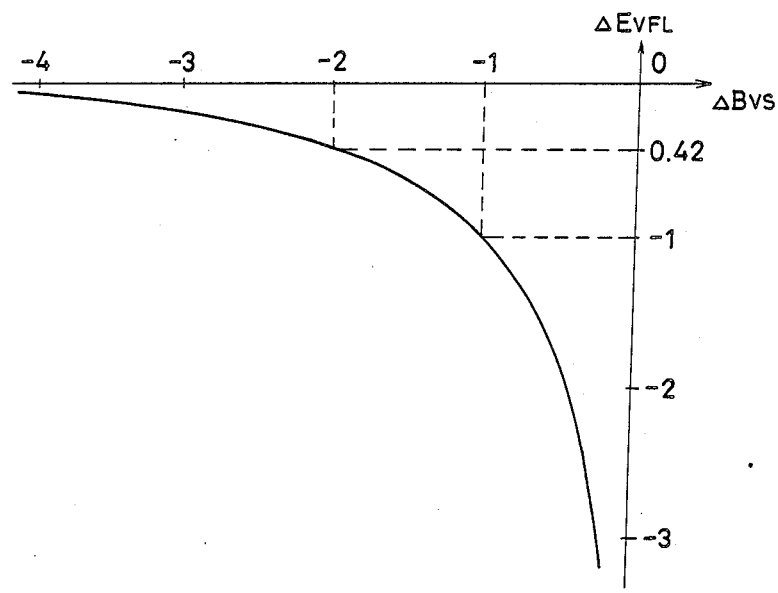
FIG. 20A is a graph showing a general principle relating to the ratio of the difference between the shutter controlling value and the brightness value of the main object to the flashlight correction amount.
Figure 20B:
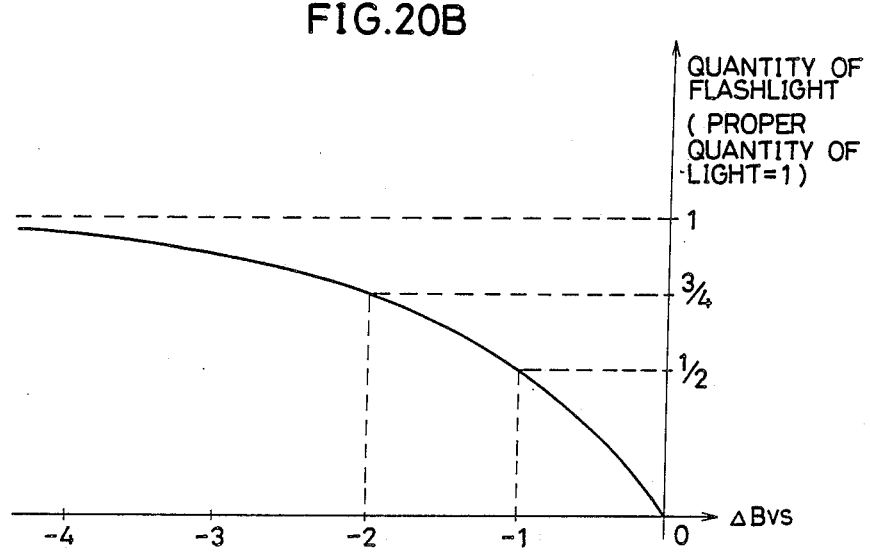
FIG. 20B is a graph showing a general principle relating to the ratio of the difference between the shutter controlling value and the brightness value of the main object to the flashlight value corresponding to the proper amount of light.

The relationship between the difference $\Delta Bvs$ (between the main object exposure value in photography with ambient light alone and the proper exposure value) and the flashlight correction amount $\Delta Evfl$ is shown in FIG. 20A, and the relation between the difference $\Delta Bvs$ and the quantity of flashlight (the proportion of flashlight relative to the proper quantity of light) is shown in FIG. 20B. In each diagram, the abscissa represents the difference $\Delta Bvs$. The ordinate represents the correction amount $\Delta Evfl$ in FIG. 20A and the quantity of flashlight ($1 - 2^{\Delta Bvs}$) in FIG. 20B. As will be apparent from these diagrams, the larger the amount of underexposure ($-\Delta Bvs$) which would result in an underexposure with ambient light alone (the smaller the $\Delta Bvs$ value), the smaller is the absolute value of the flashlight correction amount Evfl and the larger is the quantity of flashlight. Conversely, the smaller the absolute value $\uparrow Bvs \uparrow$ of said difference $\Delta Bvs$, the larger is the absolute value $\uparrow \Delta Evfl \uparrow$ of said flashlight correction amount $\Delta Evfl$ and the smaller is the quantity of flashlight.

Figure 21A:
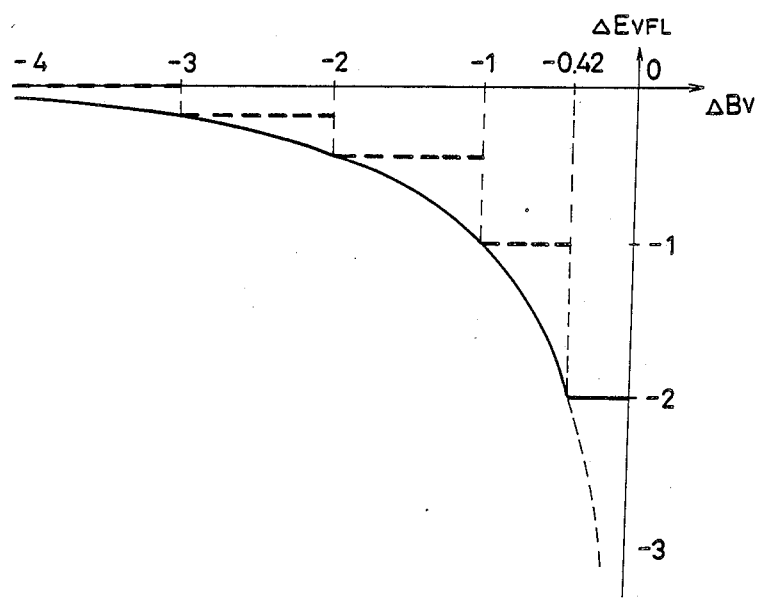
FIG. 21A is a graph showing the relation of the difference between the shutter controlling value and the brightness value of the main object with the flashlight correction amount on an automatic emission mode in the camera according to the former embodiment of this invention.
Figure 21B:
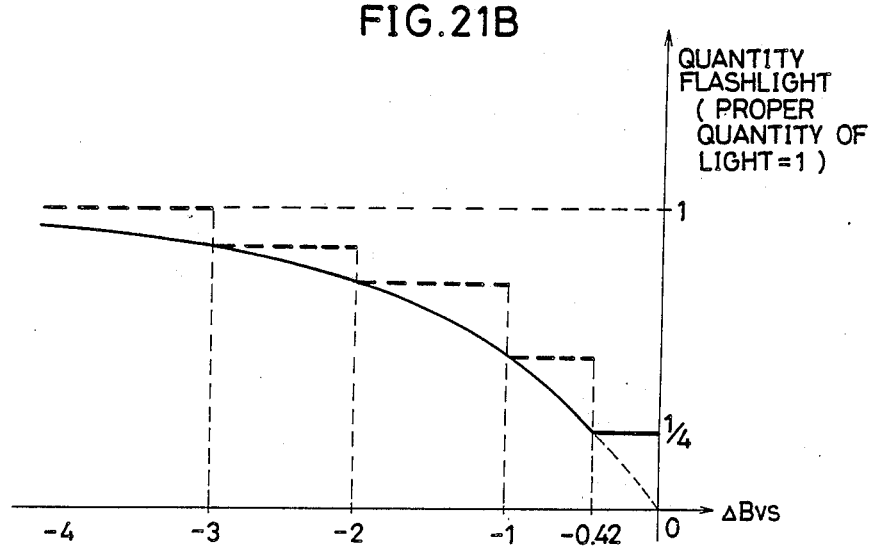
FIG. 21B is a graph showing the relation of the difference between the shutter controlling value and the brightness value of the main object with the flashlight value corresponding to the proper amount of light on an automatic emission mode in the camera according to the former embodiment of this invention.

It should also be noted that, as will be apparent from the two diagrams, when the absolute value $\uparrow \Delta Bvs \uparrow$ of difference $\Delta Bvs$ is fairly small (for example, $-0.5 \leq \Delta Bvs < 0$), the flashlight correction amount $\Delta Evfl$ shows a sharp change but the quantity of flashlight is not altered much. Moreover, if the absolute value of flashlight correction amount $\Delta Evfl$ is increased too much, the effect due to flashlight will not be adequately reflected in the photograph. Therefore, in the camera according to this embodiment, there is provided a lower limit to correction amount $\Delta Evfl$ and a predetermined quantity of flashlight is given even when the required supplemental quantity of flashlight is very small (FIGS. 21A and 21B). Specifically, the lower limit to correction amount $\Delta Evfl$ is set at $-2$ Ev in the camera according to this embodiment. When there is a lower limit to correction amount $\Delta Evfl$, the correction amount $\Delta Evfl$ can be found by approximation and the algorithm for correction amount $\Delta Evfl$ is simplified. Incidentally, FIG. 21A shows the relation between difference $\Delta Bvs$ and correction amount $\Delta Evfl$ and FIG. 21B shows the relation between difference $\Delta Bvs$ and flashlight quantity.

Figure 22A:
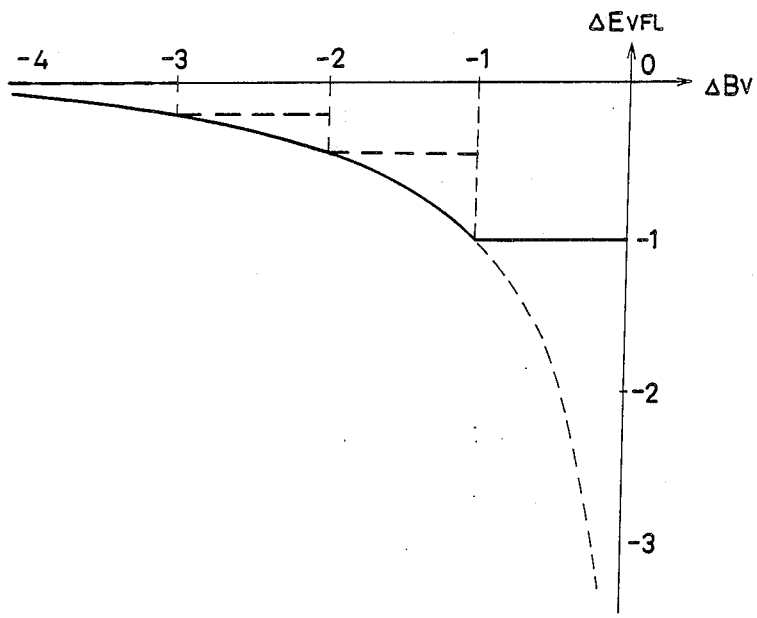
FIG. 22A is a graph corresponding to FIG. 21A, which is pertinent to another embodiment of this invention.
Figure 22B:
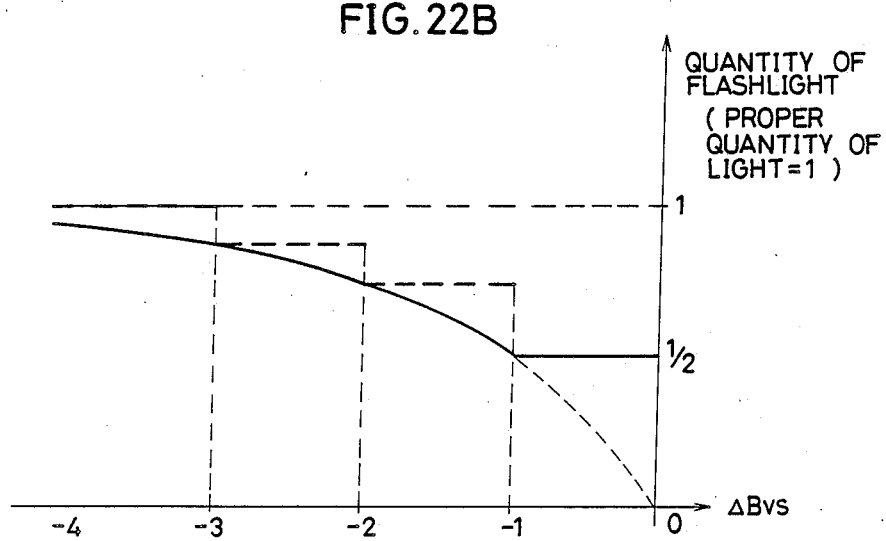
FIG. 22B is a graph corresponding to FIG. 21B, which pertains to another embodiment of this invention.

As mentioned hereinbefore, the camera according to this embodiment has an automatic emission mode on which a flashlight emission is effected automatically according to the brightness of the field and a forced emission mode on which a flashlight emission is effected irrespective of the brightness of the field. The forced emission mode is the mode the photographer selects by turning the forced emission switch (not shown) ON when he wishes to have the effect of flashlight reflected in the resulting picture. It is contrary to the photographer's intention to apply in such a situation a correction, particularly a large correction, that will detract from the flash effect. Therefore, in the camera according to this embodiment, the value of the lower limit of flash correction amount $\Delta Evfl$ is increased for the forced emission mode as compared with the automatic emission mode. More particularly, in the camera according to this embodiment, the lower limit to correction amount $\Delta Evfl$ is set at $-1$ Ev as shown in FIG. 22A. Moreover, it is seen from FIG. 22B that in the camera according to this embodiment, the quantity of flashlight on the forced emission mode accounts for at least ½ of the proper light quantity. It will further be apparent from FIGS. 21A and 21B and FIGS. 22A and 22B that when the main object is somewhat bright (when the absolute value of difference $\Delta Bvs$ is small), a larger quantity of flashlight is made on the forced emission mode than on the automatic emission mode.

The provision of a lower limit to correction amount $\Delta Evfl$ results in an overexposure of the main object but since, in the camera according to this embodiment, exposure control is made to provide a predetermined amount of overexposure to the background under rear light conditions, it does not happen that the main object is overexposed in comparison with the background in rear light photography.

As mentioned hereinbefore, the correction amount $\Delta Evfl$ is determined by a very complicated operation involving logarithmic and exponential terms. In the actual camera, however, the brightness data generated by the light measuring means 13 include errors and the tolerances for shutter control and the error of flashlight quantity are superimposed on said errors. Therefore, it would not make much sense to calculate the correction amount $\Delta Evfl$ with great precision. Therefore, in the camera according to this embodiment, an approximation of correction amount $\Delta Evfl$ is performed using step functions as indicated by broken lines in FIGS. 21A and 21B and FIGS. 22A and 22B. This approximation of correction amount $\Delta Evfl$ in the camera according to this embodiment is carried out in such a manner that in order to prevent an underexposure of the main object by excessive correction of flashlight, the amount of correction will not be increased over the exact value (so that the absolute value of correction amount $\Delta Evfl$ will be decreased). Therefore, in the camera according to this embodiment, the main object may be overexposed depending on conditions but in view of the broader latitude of photographic film on the overexposure side than on the underexposure side, a minor overexposure of the main object will not cause problems of any serious concern.

Figure 23:
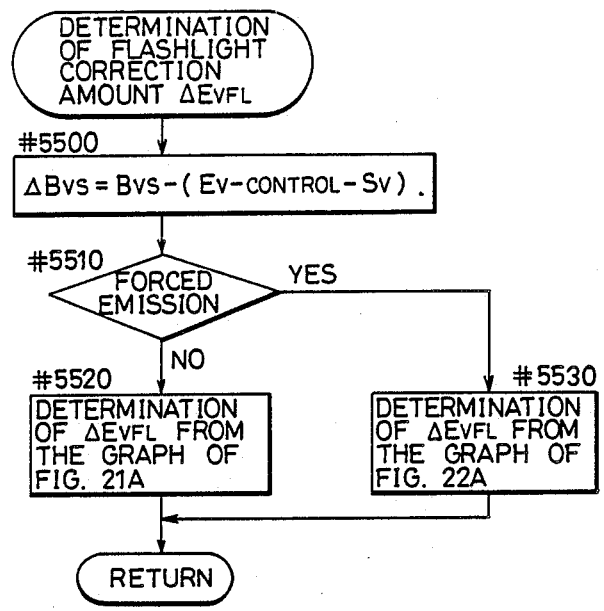
FIG. 23 is a flow chart showing the method of determining the flashlight correction amount in the camera according to the former embodiment of this invention.

Now, a specific method for calculating the correction amount Evfl in the camera of this embodiment is described below with reference to FIG. 23. The flow chart presented in FIG. 23 is a specific example of step #1600 (the subroutine "determination of flash correction amount $\Delta Evfl$") in the flow chart of FIG. 6.

Arriving at this subroutine, the microcomputer 1 first calculates the exposure difference $\Delta Bvs$ mentioned hereinbefore (#5500). The microcomputer 1 then checks whether the emission mode is the forced emission mode (#5510). Detecting that the forced emission switch not shown is turned ON from the information stored in step #32 in FIG. 2, the microcomputer 1 advances to step #5530 and calculates the correction amount $\Delta Evfl$ according to the graph traced by a solid line in FIG. 22A. On the other hand, if the forced emission switch is OFF, the microcomputer 1 advances to step #5520, where it calculates the correction amount $\Delta Evfl$ according to the graph traced by a solid line in FIG. 21A. After this calculation of correction amount $\Delta Evfl$, the microcomputer 1 returns to the flow chart of FIG. 6.

Determination of the Aperture Value Avd Indicative of the Timing of Flashlight Emission Now, flash control in the camera of this embodiment is described below.

As mentioned earlier in this specification, the camera according to this invention has the so-called lens shutter, which means that the shutter blades double as diaphragm blades, and a flashlight emission is caused to occur when, in the course of opening of the shutter blades, the shutter opening has reached an appropriate size. As is well known, the main object is properly exposed by flashlight alone if the following diaphragm aperture value Avdo is satisfied:

$$Avdo = Iv + Sv - Dv$$

where Iv is the flashlight amount, Sv is the sensitivity of the film, and Dv is the APEX value of the distance of the main object. In the conventional camera equipped with a lens shutter, it is common practice to previously determine the time period tdo from the time the shutter begins to open to the time it attains the size of opening corresponding to the aperture value Avdo according to the opening characteristic of the shutter and cause a flashlight emission to take place when said time tdo has lapsed after the shutter began to open.

Now, in the camera according to this embodiment, the flashlight amount is corrected in consideration of ambient light component even in flash photography as mentioned hereinbefore. In this case, if a flash emission is actuated with the aperture having reduced by an amount corresponding to the absolute value of correction amount ΔEvfl, the main object is properly exposed by ambient light plus flashlight. Thus, if a flashlight emission is caused to occur when the shutter opening has reached the following aperture value Avd, the main object is properly exposed by ambient light plus flashlight:

$$Avd = Avdo - Evfl = Iv + Sv - Dv - \Delta Evfl.$$

Figure 24:
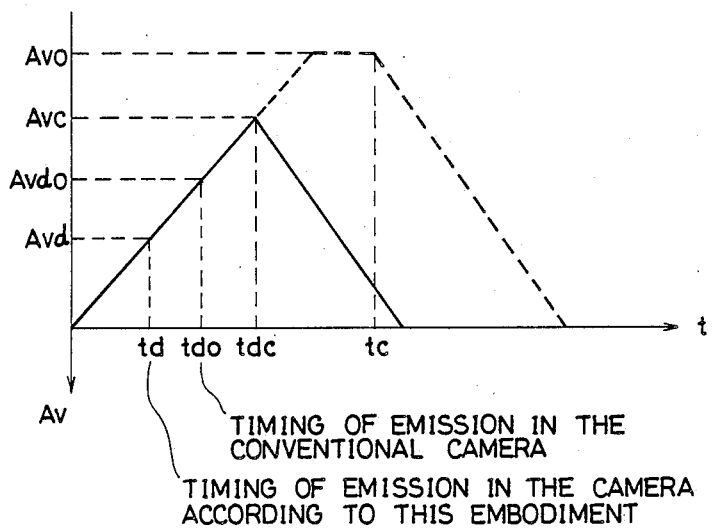
FIG. 24 is a graph showing the aperture characteristic of a general lens shutter.

FIG. 24 shows the shutter opening characteristic in the camera according to this embodiment. In the view, the abscissa represents the time after the shutter begins to open and the ordinate represents the shutter opening (diaphragm opening), with the aperture value increasing (the size of diaphragm opening decreasing) down the axis. In the diagram, Avdo is the aperture value at which the main object is properly exposed by flashlight alone and Avd is the aperture value after correction of Avdo so as to insure that the main object will be properly exposed by ambient light plus flashlight. It will be apparent in the diagram that the time periods till the diaphragm opening reaches the two aperture values Avdo and Avd are tdo and td, respectively.

In the same diagram, Avc is the aperture value determined according to the shutter controlling value Ev-control, and tdc is the time till the diaphragm opening reaches the aperture value Avc. Thus, upon lapse of time tdc after the shutter began to open, the microcomputer 1 outputs a signal to the shutter control circuit 15 to initiate a shutter closing action. As will be apparent from the diagram, the shutter controlling waveform is triangular. The symbol Avo represents the full open aperture value of the diaphragm, and when a very dark object is photographed with ambient light only, the shutter controlling waveform is trapezoidal as indicated by a broken line. The symbol tc represents the timing of closing the shutter in the above case.

Now, in the camera of this embodiment, the flashlight amount is corrected, as mentioned hereinbefore, to compensate for the shortage of ambient light by flashlight. In a camera like this, in the situation where the flashlight does not reach the main object, which lies at a long distance, for instance, the main object is sometimes underexposed. Therefore, in the camera according to this embodiment, when it is suspected that the flashlight will not reach the main object, the shutter controlling value Ev-control is shifted to the overexposure side so as to increase the proportion of ambient light.

The adequate amount of this shift can be found by a calculation taking various conditions into account. In the camera of this embodiment, however, in order to simply the necessary algorithm, a calculation for flash control is repeated while the shutter controlling value Ev-control is shifted by a predetermined amount e. Moreover, lest the background etc. will be too much overexposed by using an excessively large shift amount, an upper limit M is set to the number of shifts.

Now, the upper limit M to the number of shifts for the shutter controlling value Ev-control and the amount of each shift e are discussed below.

For rear light photography, the shutter controlling value Ev-control in the camera according to this embodiment is set so that the background will be overexposed by 1 Ev in comparison with the proper exposure. When the flashlight does not reach the main object well, the shutter controlling value is shifted, by ne, to the overexposure side:

$$Ev\text{-}control = Ev\text{-}control - ne$$

where n is the number of shifts. Therefore, the background is overexposed by (1+ne). As long as this amount of overexposure is within the film latitude, there is no photographic problem. Taking a negative film as an example, since its latitude on the overexposure side is about +3, the upper limit M to the number of shifts may be set at $1 + Me = 3$ and such combinations as $M = 4$, $e = 0.5$ or $M = 2$, $e = 1$ may be selected in consideration of accuracy of exposure control and calculation speed. Of course, it may be so arranged that the film latitude is read from the DX code of the film and the upper limit M and the amount of shift e be accordingly adjusted.

Figure 25:
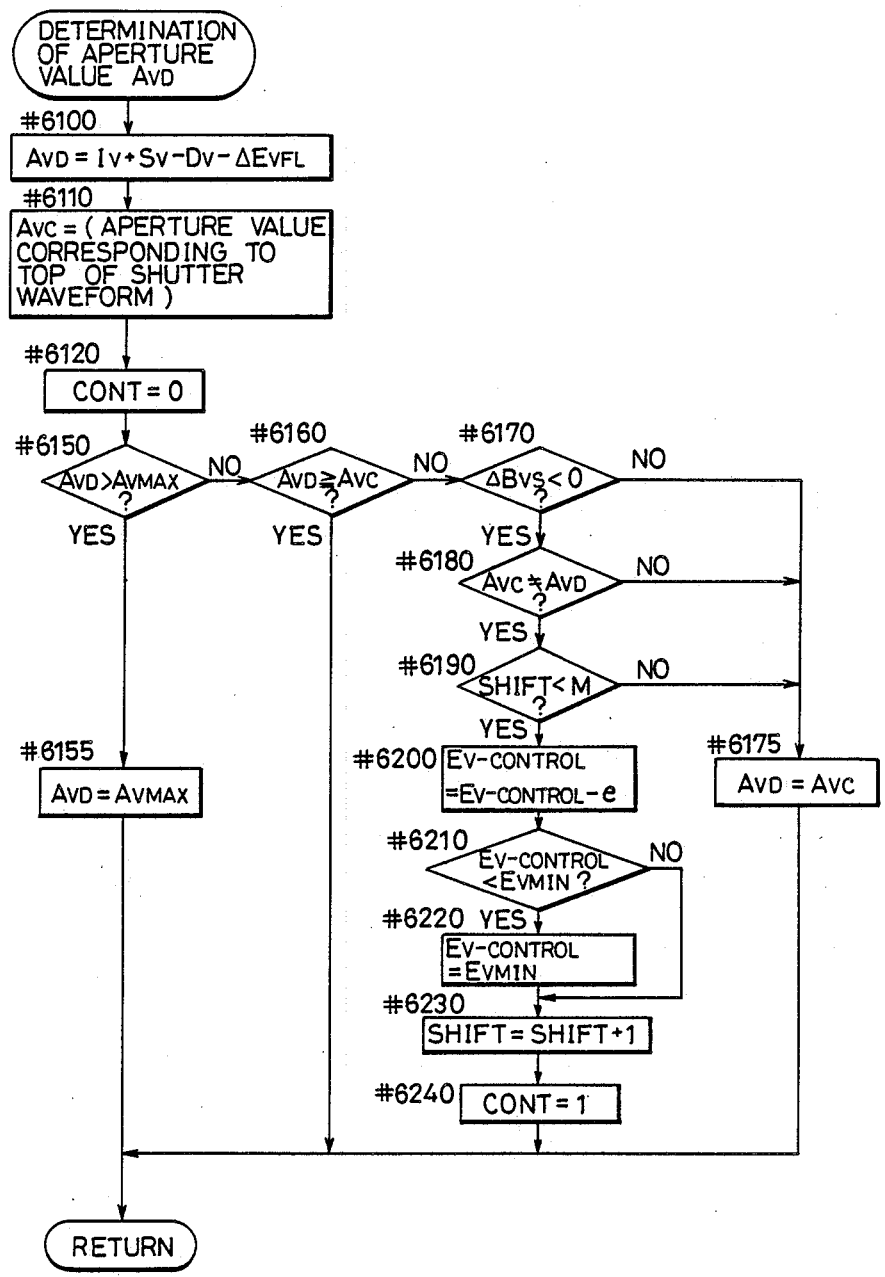
FIG. 25 is a flow chart showing the method of determining the timing of flashlight emission in the former embodiment of this invention.

Now, a specific example of the method for shifting the shutter controlling value Ev-control in the camera of this embodiment is described below with reference to FIG. 25.

First, the microcomputer 1 calculates the aperture value Avd mentioned hereinbefore (#6100). The microcomputer 1 then determines the aperture value Avc corresponding to the apex of the top of the shutter waveform (FIG. 24) based on the shutter controlling value Ev-control (#6110). The camera of this embodiment is adapted to previously determine the aperture value Avc corresponding to a shutter controlling value Ev-control based on the shutter waveform, store the information in a ROM and read it out from the ROM as necessary.

The microcomputer 1 then resets the flag CONT (#6120). This flag CONT is set when, because of the shift of the shutter controlling value Ev-control, the aperture values Avd and Avc must be re-calculated.

After resetting the flag CONT, the microcomputer 1 determines whether the flashlight would sufficiently reach the main object or not.

First, the microcomputer 1 compares the aperture value Avd determined at step #6100 with the maximum aperture value of the shutter (the aperture value corresponding to the minimum diaphragm opening) Avmax (#6150). Then, if Avd>Avmax, that is to say when the main object is overexposed by flashlight and ambient light even if a flashlight emission occurs at the minimum diaphragm opening, the microcomputer 1 advances to step #6155 where it re-sets the aperture value Avd at Avmax. Unless this re-setting is made, a flash emission will take place before opening of the shutter. After the aperture value Avd has been re-set, the microcomputer 1 returns to the flow chart shown in FIG. 6.

If Avd≦Avmax at step #6150, the microcomputer 1 advances to step #6160, where it compares the aperture value Avd determined at step #6100 with the aperture value Avc determined at step #6110. If Avd≧Avc, no correction is made, for if a flashlight emission occurs at the moment when the aperture value of the shutter opening has reached Avd (when the time td has elapsed after the shutter began to open), the main object will be properly exposed by ambient light plus flashlight. The microcomputer 1 then returns to the flow chart of FIG. 6.

On the other hand, if Avd<Avc at step #6160, there will be a deficiency of flashlight and the main object will be underexposed even if a flashlight emission is caused to occur with the shutter opened to the diaphragm setting determined from the shutter controlling value Ev-control. Therefore, in order to increase the proportion of ambient light with respect to the proper exposure amount and insure the proper exposure of the main object, the microcomputer 1 advances to step #6170 for shifting the shutter controlling value Ev-control to the overexposure side.

At steps #6170 to #6190, the microcomputer 1 determines whether no problem will be presented by shifting the shutter controlling value.

At step #6170, the microcomputer 1 checks the difference ΔBvs between the main object exposure value for exposure with ambient light alone and the proper exposure value. If ΔBvs≧0, that is to say the use of ambient light alone will result in the proper exposure or overexposure of the main object, the microcomputer 1 does not shift the shutter controlling value Ev-control and advances to step #6175, where it re-sets the aperture value Avd at the aperture value Avc. By this operation, the degree of overexposure of the main object is minimized.

If ΔBvs<0 at step #6170, the microcomputer 1 advances to step #6180, where it checks whether the aperture value Avc determined at step #6110 is equal to the full open aperture value Avo. Then, if Avc=Avo, that is to say the timing of flashlight emission cannot be delayed any further and the quantity of flashlight given to the main object cannot be increased any further even if the shutter controlling value Ev-control is further shifted, the microcomputer 1 advances to step #6175, where it re-sets the aperture value Avd at the aperture value Avc and discontinues shifting. As a result, the main object is most properly exposed.

If Avc≠Avo at step #6180, the microcomputer 1 advances to step #6190 where it determines the number of shifts SHIFT of the shutter controlling value Ev-control has reached the upper limit M. If the number of shifts SHIFT has reached the upper limit M, the microcomputer 1 advances to step #6175 where it re-sets the aperture value Avd at the aperture value Avc and prohibits a further shift.

If the number of shifts SHIFT has not reached the upper limit M as yet at step #6190, the microcomputer 1 advances to step #6200 where it shifts the shutter controlling value Ev-control by the predetermined amount e to overexposure side. Thus, $Ev\text{-}control = Ev\text{-}control - e.$ After shifting the shutter controlling value Ev-control, the microcomputer 1 determines whether shutter control is feasible according to the shifted shutter controlling value Ev-control (#6210) or not. Thus, the microcomputer 1 compares the shifted shutter controlling value Ev-control with the minimum controllable shutter controlling value Evmin. Thus, if Ev-control<Evmin, that is to say when shutter control is not feasible, the microcomputer 1 advances to step #6220 where it re-sets the shutter controlling value Ev-control a the minimum controllable shutter controlling value Evmin. It then advances to step #6230. On the other hand, if Ev-control ≧Evmin, that is to say when shutter control is feasible, the microcomputer 1 skips to step #6230.

At step #6230, the microcomputer 1 increments the counter SHIFT indicating the number of shifts and, thereafter, sets the flag CONT in order to determine the aperture value Avd again at step #6240. The microcomputer 1 then returns to the flow chart of FIG. 6.

It will be apparent from the foregoing description that in the camera according to this embodiment, the shutter controlling value Ev-control is shifted until the aperture value Avc determined from the shutter controlling value Ev-control has reached the full open aperture value Avo (that is to say until the state where the shutter is to be opened to the maximum opening size) or the number of the shifts SHIFT has reached the upper limit M.

The following description pertains to other embodiments of this invention.

Second Embodiment

In the camera according to the first embodiment described hereinbefore, the distance measuring area LMA of the light measuring means 13 is divided, as illustrated in FIG. 3, into a total of 4 areas, namely the three central areas of L, C and R and a peripheral area OUT located around said central areas. However, as mentioned previously, the distance measuring area LMA is not limited to the foregoing but many modifications may be contemplated. A modification of the brightness measuring means which has a distance measuring area different from the one shown in FIG. 3 will hereinafter be described and the method of determining the shutter controlling value Ev-control in a camera employing such modified light measuring means will also be explained.

Figure 26:
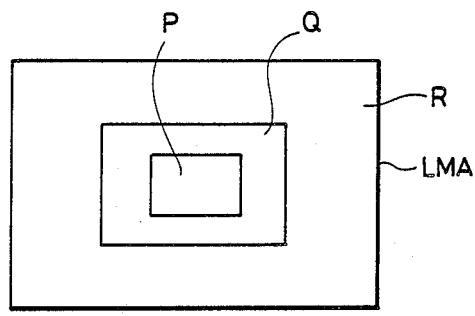
FIG. 26 is a diagram showing the brightness measuring range of brightness measuring means in the camera according to another embodiment of this invention.

The distance measuring area of a light measuring means according to this second embodiment is illustrated in FIG. 26. It will be apparent that the distance measuring area LMA according to this modification consists of a rectangular first central distance measuring area P which is situated in the center of the photographic range FRM, a rectangular second central distance measuring area Q which is situated around said first area P, and a peripheral distance measuring area R which is surrounding said second area Q. The size of said first central distance measuring area P is substantially equal to the size of the photographic range when the focal length of the photographing lens is 200 mm. The size of the second central instance measuring area Q, inclusive of the size of the first central distance measuring area P, is substantially equal to the photographic range when the focal length of the photographing lens is 100 mm. And the size of the entire distance measuring area LMA is substantially equal to the size of the photographic range when the focal length of the photographing lens is 50 mm.

The method for determining the shutter controlling value Ev-control in the camera equipped with a light measuring means having the above distance measuring area LMA is described below. It should be understood that this camera is equipped with a zoom lens, the focal length of which can be varied over the range from 28 mm to 135 mm. The following description will be made for respective lens focal lengths.

(I) When the focal length of the photographing lens is set to 35 mm

Figure 27:
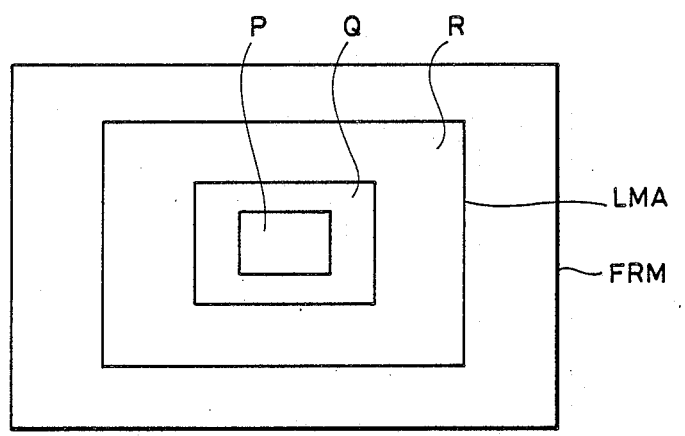
FIG. 27 is a diagram showing the brightness measuring range and photographing range or field for short-focal-length photography in the camera equipped with the brightness measuring means illustrated in FIG. 26.

As illustrated in FIG. 27, the photographic range FRM in this case is slightly larger than the distance measuring area LMA. Therefore, the shutter controlling value Ev-control is determined by giving equal weights to the brightness data Bvp, Bvq and Bvr in the three distance measuring areas P, Q and R. Thus, $$Ev\text{-}control = (Bvp + Bvq + Bvr)/3 + Sv.$$

(II) When the focal length of the photographing lens is set to 50 mm

In this case, the photographic range FRM is substantially equal to the distance measuring area LMA as mentioned above. Under this condition, the main object is usually located in the center of the photographic range FRM. For this reason and in order to minimize the influence of the sky which exists in the peripheral area with high probability, the brightness data Bvr generated in the outermost peripheral distance measuring area R is not adapted and the shutter controlling value Ev-control is determined by giving equal weights to the brightness data Bvp and Bvq in the first and second central distance measuring areas P and Q. Thus, $$Ev\text{-}control = (Bvp + Bvq)/2 + Sv.$$

(III) When the focal length of the photographing lens is set to 100 mm

In this case, as mentioned above, the photographic range FRM is substantially equal to the sum of the first central distance measuring area P and the second central distance measuring area Q. In this condition, the main object is usually situated in the center of the photographic range FRM. For this reason and in order to minimize the influence of the sky which may exist in the peripheral area with high probability, the brightness data Bvp in the innermost distance measuring area P is only used in the determination of the shutter control value Ev-control. Thus, $$Ev\text{-}control = Bvp + Sv.$$

(IV) When the focal length of the photographing lens is set to values other than the above
(i) In the case of less than 35 mm
In this case, the shutter controlling value Ev-control is determined in the same manner as when the focal length of the photographic lens has been set to 35 mm. Thus, $$Ev\text{-}control = (Bvp + Bvq + Bvr)/3 + Sv.$$

(ii) In the case of 100 mm or longer
In this case, the shutter controlling value Ev-control is determined in the same manner as when the focal length of the photographing lens has been set at 100 mm. Thus, $$Ev\text{-}control = Bvp + Sv.$$

Figure 28:
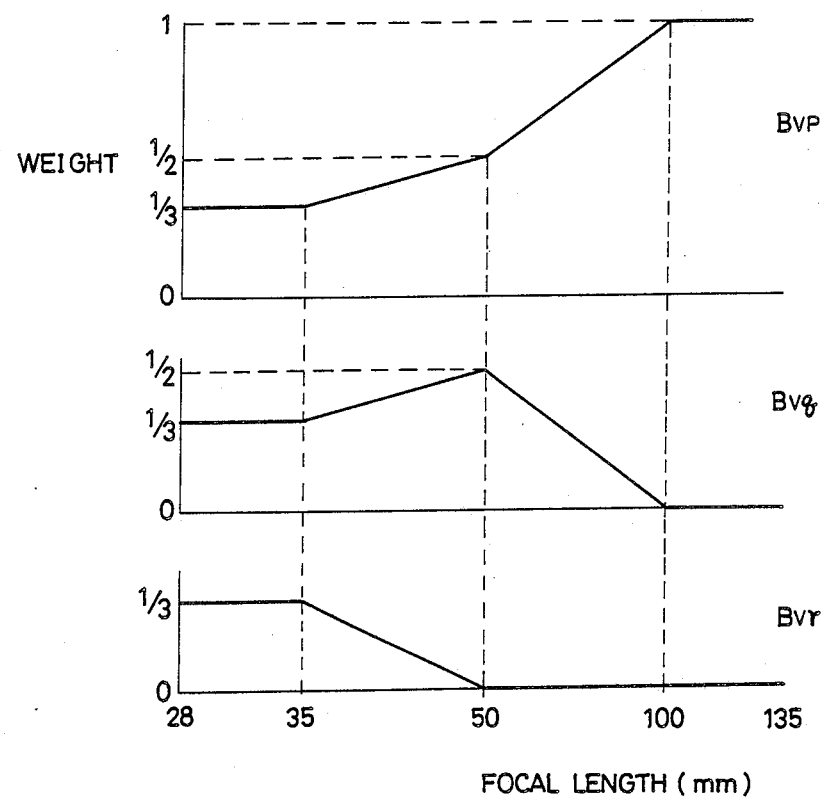
FIG. 28 is a graph showing the relationship between the focal length of the photographing lens and the weights to be applied to brightness data in the respective brightness measuring areas for determination of the shutter controlling value in the camera equipped with the brightness measuring means illustrated in FIG. 26.

(iii) Other cases
When the focal length of the photographing lens is set at 35 mm~50 m or 50 mm~100 mm, the shutter controlling value Ev-control is determined by varying the weights to the brightness data Bvp, Bvq and Bvr in respective distance measuring areas R, Q and R continuously as shown in FIG. 28. Although, in this modification, the weights to the brightness data Bvp, Bvq and Bvr are continuously varied, it is of course possible to vary the weights according to a curve such that the sum of the weights to respective brightness data Bvp, Bvq and Bvr will be equal to 1.

Third Embodiment 0 In the camera of the first embodiment (step #1150 in FIG. 6), with regard to the second zone where distance data are scattered according to the depth of the object, it is assumed that the object distance is measured as the same object when the difference in distance is less than a predetermined value (specifically, 15 cm).

However, when a souvenir picture is taken of a large group of people (usually, photographed at some distance), a fairly large difference occurs in photographing distance between the persons in the front row and those in the back row. Assuming that there are 3 rows, there is a difference of about 1 m between any person in the foremost row and another in the rearmost row. In taking such a group picture, the persons in the foremost row and those in the rearmost row should be regarded as the same object but if the difference in distance which would validate the assumption of the same object is fixed, it is impossible to detect the proper range of close zone in the situation where the distance range validating the assumption of the same object is large as in a group picture.

Therefore, it is preferable, instead of fixing the difference in distance validating the assumption of the same object, to make this difference variable. When an object with a large depth is photographed, the photographing distance is usually longer. Therefore, the above-mentioned difference in distance is preferably increased as the photographing distance is increased.

Furthermore, the range in which a sharp focus can be assumed (depth of field) is deeper on the far side than on the near side. In consideration of this fact, the range validating the assumption of the same object may be made broader on the far side than on the near side.

Table 3 shows a specific example of the relationship between the photographing distance and the difference in distance validating the assumption of the same object in this embodiment. As will be apparent from the table, in this example, the difference in distance validating the assumption of the same object becomes greater as the photographing distance is increased and is larger on the far side than on the near side as mentioned above.

Thus, the multi-divisional light measuring apparatus according to this invention not only permits an accurate detection of rear light but also permits an accurate determination of the brightness of the main object irrespective of whether in front light photography or in rear light photography.

Furthermore, the flash device according to this invention not only provides an accurate exposure of the main object irrespective of front light or rear light but also allows an impression of rear light photography to be reproduced in the picture.

Although the present invention has been described and illustrated in detail, it is clearly understood that the same is by way of illustration and example only and is not to be taken by way of limitation, the spirit and scope of the present invention being limited only by the terms of the appended claims.

TABLE 1

| Zone Number | Stop Position (m) | Dv | Range of Zone (m) | Range of Near Zone Zf | Zn |
| --- | --- | --- | --- | --- | --- |
| 1 | 1.53 | 7.055 | ~8.486 | 1 | 3 |
| 2 | 6.720 | 5.497 | 8.486~5.571 | 1 | 4 |
| 3 | 4.762 | 4.503 | 5.571~4.160 | 1 | 5 |
| 4 | 3.697 | 3.773 | 4.160~3.328 | 2 | 6 |
| 5 | 3.030 | 3.199 | 3.328~2.778 | 3 | 7 |
| 6 | 2.567 | 2.720 | 2.778~2.388 | 4 | 8 |
| 7 | 2.232 | 2.317 | 2.388~2.096 | 5 | 9 |
| 8 | 1.977 | 1.967 | 2.096~1.871 | 6 | 10 |
| 9 | 1.776 | 1.657 | 1.871~1.695 | 7 | 11 |
| 10 | 1.613 | 1.379 | 1.695~1.543 | 8 | 12 |
| 11 | 1.479 | 1.129 | 1.543~1.421 | 9 | 13 |
| 12 | 1.367 | 0.902 | 1.421~1.317 | 10 | 14 |
| 13 | 1.271 | 0.692 | 1.317~1.228 | 11 | 15 |
| 14 | 1.189 | 0.499 | 1.228~1.152 | 12 | 16 |
| 15 | 1.117 | 0.319 | 1.152~1.084 | 13 | 17 |
| 16 | 1.054 | 0.152 | 1.084~1.025 | 14 | 18 |
| 17 | 0.998 | −0.006 | 1.025~0.972 | 15 | 20 |
| 18 | 0.948 | −0.154 | 0.972~0.925 | 16 | 21 |
| 19 | 0.904 | −0.291 | 0.925~0.884 | 16 | 23 |
| 20 | 0.864 | −0.422 | 0.884~0.846 | 17 | 25 |
| 21 | 0.828 | −0.545 | 0.846~0.812 | 18 | 25 |
| 22 | 0.796 | −0.658 | 0.812~0.781 | 19 | 25 |
| 23 | 0.767 | −0.765 | 0.781~0.753 | 19 | 25 |
| 24 | 0.740 | −0.869 | 0.753~0.734 | 20 | 25 |
| 25 | 0.715 | −0.968 | 0.734~0.700 | 20 | 25 |

TABLE 2

| | | Main Object Distance | | |
| --- | --- | --- | --- | --- |
| | | ~1 m | 1 m~2 m | 2 m~ |
| Type of photography | Standard | D | C | D |
| | Tele | C | A | C |
| | TC | A | B | A |

Standard — Standard photography (short focal length) - 38 mm
Tele — Telephotography (long focal length) - 80 mm
TC — Teleconverter photography - equivalent to 105 mm

TABLE 3

| Photographing Distance (m) | Difference in Distance Near Side | Far Side |
| --- | --- | --- |
| ~1 | ≦10 cm | ≦15 cm |
| 1~2 | ≦20 cm | ≦30 cm |
| 2~4 | ≦50 cm | ≦80 cm |
| 4~ | ≦1 m | ≦2 m |

What is claimed is:

1. A brightness measuring apparatus comprising:
light receiving means having a plurality of light receiving elements for respectively receiving light from a plurality of areas in a photographic range and outputting data values corresponding to said areas based on the respective amounts of light received;
focal length detecting means for detecting the focal length of a photographing lens;
deciding means for deciding a rear light detection level value based on the focal length detected; and
rear light judging means for judging whether or not rear light photography is to be carried out based on the values outputted from said light receiving means and the rear light detection level value.

2. The brightness measuring apparatus according to claim 1, wherein
said light receiving means comprises at least a first light receiving element and a second light receiving element having a larger light receiving area than said first light receiving element, and
said rear light detecting means comprises a calculating means for calculating the difference between the values outputted from said first and second light receiving elements of said light receiving means, and it is judged the rear light photography when the value of said difference is not less than the value of said rear light detection level.

3. The brightness measuring apparatus according to claim 2, wherein
the value of said rear light detection level is increased as the focal length of the photographing lens is increased.

4. The brightness measuring apparatus according to claim 2, wherein
the value of said rear light detection level is modified based on the value outputted from said second light receiving element of said light receiving means.

5. A brightness measuring apparatus comprising:
a light receiving means having a plurality of light receiving elements for respectively receiving light from a plurality of areas in a photographic range and outputting data values corresponding to said areas based on the respective amounts of light received;
image magnification detecting means for detecting the image magnification;
deciding means for deciding a value of said rear light detection level based on the detected image magnification; and
rear light judging means for judging whether or not rear light photography is to be carried out based on the values outputted from said light receiving means and the rear light detection level value.

6. The brightness measuring apparatus according to claim 5 further comprising:
focal length detecting means for detecting the focal length of a photographing lens; and
distance measuring means for measuring a distance from a photographing system to the object, wherein said image magnification detecting means detects the image magnification based on the detected focal length and the measured object distance.

7. The brightness measuring apparatus according to claim 6, wherein
said light receiving means comprises at least a first light receiving element and a second light receiving element having a larger light receiving area than said first light receiving element, and
said rear light judging means comprises
calculating means for calculating the difference between the values outputted from said first and second light receiving elements of said light receiving means, it is judged the rear light photography is to be carried out when the value of said difference is not smaller than the value of said rear light detection level.

8. The brightness measuring apparatus according to claim 7, wherein
the value of said rear light detection level increases as the image magnification is increased.

9. A brightness measuring apparatus comprising:
light receiving means having a plurality of light receiving elements for respectively receiving light from a plurality of areas in a photographic range and outputting values corresponding to said areas based on the respective amounts of light received;
distance measuring means for measuring an object distance from a photographing portion to an object to be photographed;
deciding means for deciding a rear light detection level in accordance with the measured object distance to produce a rear light detection value corresponding to the decided rear light detection level, so that, both of a first rear light detection level decided with the measured object distance is smaller than a first distance, and a second rear light detection level decided when the measured object distance is larger than a second distance, are lower than a third rear light detection level decided when the measured object distance is between the first and second distances, the first distance being smaller than the second distance; and
rear light judging means for judging whether the object to be photographed is under rear light conditions based on the values outputted from said light receiving means and the rear light detection level value.

10. The brightness measuring apparatus according to claim 9, wherein
said light receiving means comprises at least a first light receiving element and a second light receiving element having a larger light receiving area than said first light receiving element, and
said rear light judging means comprises
calculating means for calculating the difference between the values outputted from said first and second light receiving elements of said light receiving means, and means for judging the object is under rear light conditions when the value of said difference is not smaller than the value of said rear light detection level.

11. The brightness measuring apparatus according to claim 9, wherein said first rear light detection level is equal to said second rear light detection level.

12. The brightness measuring apparatus according to claim 9, wherein said first distance is one meter (1 m) and said second distance is two meters (2 m).

13. A brightness measuring apparatus comprising:
a light receiving means having a plurality of light receiving elements for respectively receiving light from a plurality of areas in a photographic range and outputting values corresponding to said areas based on the respective amounts of light received;
distance measuring means for respectively measuring a distance between a camera and an object in each of a plurality of areas and outputting distance data corresponding to the respective areas;
main object detecting means for detecting a main object of the objects based on said distance data;
deciding means for lowering a value of a rear light detection level in order to facilitate the detection of rear light condition when the distance to said main object is shorter than a first distance; and
rear light judging means for judging whether or not the object to be photographed is under rear light conditions based on the values outputted from said light receiving means and the rear light detection level value.

14. The brightness measuring apparatus according to claim 13, wherein
said deciding means decides the value of said rear light detection level in order to facilitate the detection of rear light when the distance to said main object is longer than a second distance which is longer than said first distance.

15. A brightness measuring apparatus comprising:
first light receiving means for receiving light from a first area of a photographic range and outputting the amount of light received as a first value;
second light-receiving means for receiving light from a second area of said photographic range, which is larger than said first area, and outputting the amount of light received as a second value;
deciding means for deciding a value of said rear light detection level in order to facilitate the detection of rear light condition when said second value is larger than a predetermined value; and
rear light judging means for judging whether or not an object to be photographed is under rear light conditions based on said first and second values and the rear light detection level value.

16. The brightness measuring apparatus according to claim 15 which further comprises:
calculation means for calculating the value of difference between said first and second values.

17. The brightness measuring apparatus according to claim 16, wherein
said rear light judging means judges the rear light condition when the said value of difference is not smaller than the value of rear light detection level.

* * * * *

UNITED STATES PATENT AND TRADEMARK OFFICE
CERTIFICATE OF CORRECTION

PATENT NO. : 4,963,915

DATED : October 16, 1990

INVENTOR(S) : Masayuki IKEMURA, et al.

It is certified that error appears in the above-identified patent and that said Letters Patent is hereby corrected as shown below:

Title Page:
[75] INVENTORS:

Change name of the second inventor to read:

--Toshihiko KARASAKI--

Signed and Sealed this

Twenty-seventh Day of October, 1992

Attest:

DOUGLAS B. COMER

*Attesting Officer*      *Acting Commissioner of Patents and Trademarks*